United States Patent
Takagi

(10) Patent No.: US 9,312,714 B2
(45) Date of Patent: Apr. 12, 2016

(54) CONTROL DEVICE AND CONTROL METHOD, POWER GENERATION DEVICE AND POWER GENERATION METHOD, POWER STORAGE DEVICE AND POWER STORAGE METHOD, AND POWER CONTROL SYSTEM

(75) Inventor: Yuto Takagi, Kanagawa (JP)

(73) Assignee: Sony Corporation, Tokyo (JP)

( * ) Notice: Subject to any disclaimer, the term of this patent is extended or adjusted under 35 U.S.C. 154(b) by 602 days.

(21) Appl. No.: 13/810,539

(22) PCT Filed: Jul. 15, 2011

(86) PCT No.: PCT/JP2011/066219
§ 371 (c)(1),
(2), (4) Date: Feb. 12, 2013

(87) PCT Pub. No.: WO2012/011440
PCT Pub. Date: Jan. 26, 2012

(65) Prior Publication Data
US 2013/0134922 A1 May 30, 2013

(30) Foreign Application Priority Data

Jul. 23, 2010 (JP) ................................ P2010-166194

(51) Int. Cl.
*H02J 7/00* (2006.01)
*H01M 10/44* (2006.01)
(Continued)

(52) U.S. Cl.
CPC ............ *H02J 7/0052* (2013.01); *H01M 10/44* (2013.01); *H01M 10/48* (2013.01); *H02J 5/005* (2013.01);
(Continued)

(58) Field of Classification Search
CPC ........................................................ H02J 7/35
USPC ........................................................ 320/101
See application file for complete search history.

(56) References Cited

U.S. PATENT DOCUMENTS

| 5,025,202 A * | 6/1991 | Ishii ........................ H02J 7/35 136/293 |
| 2011/0234150 A1* | 9/2011 | Furukawa ............. H02J 7/0027 320/101 |
| 2014/0070756 A1* | 3/2014 | Kearns .................... H02J 7/007 320/101 |

FOREIGN PATENT DOCUMENTS

| JP | 2001-069688 A | 3/2001 |
| JP | 2001-159936 A | 6/2001 |

(Continued)

*Primary Examiner* — Suresh Memula
(74) *Attorney, Agent, or Firm* — Wolf, Greenfield & Sacks, P.C.

(57) ABSTRACT

The present invention relates to a control device and a control method, a power generation device and a power generating method, a power storage device and a power storing method, and a power control system that are capable of using generated electric power with higher efficiency. A controller (110) acquires information relating to a power storage state and the like from each power storage device (130) and determines a power transmission source and a power transmission destination of electric power generated by a power generation device (120), for example, as denoted by white arrows based on the information. The controller (110) supplies a power transmission instruction including information of the power transmission destination to the power generation device (120) as the power transmission source and supplies a power reception instruction including information of the power transmission source to the power storage device (130) as the power transmission destination. The power generation device (120) and the power storage device (130) perform power transmission and power reception based on the instructions. The present invention can be applied to, for example, a power generation device.

22 Claims, 11 Drawing Sheets

(51) Int. Cl.
*H01M 10/48* (2006.01)
*H02J 5/00* (2006.01)
*H02J 3/38* (2006.01)
*H02J 7/35* (2006.01)
*H02J 17/00* (2006.01)
*H02J 1/00* (2006.01)

(52) U.S. Cl.
CPC ................ *H02J 3/386* (2013.01); *H02J 7/0013* (2013.01); *H02J 7/35* (2013.01); *H02J 17/00* (2013.01); *H02J 2001/004* (2013.01); *Y02E 10/763* (2013.01)

(56) References Cited

FOREIGN PATENT DOCUMENTS

| | | |
|---|---|---|
| JP | 2003-047177 A | 2/2003 |
| JP | 2005-261187 A | 9/2005 |
| JP | 2006-113890 A | 4/2006 |
| JP | 2006-174540 A | 6/2006 |
| JP | 2007-097373 A | 4/2007 |
| JP | 2008-017691 A | 1/2008 |
| JP | 2008-148442 A | 6/2008 |
| JP | 2011-172377 A | 9/2011 |

\* cited by examiner

CONTROL DEVICE AND CONTROL METHOD, POWER GENERATION DEVICE AND POWER GENERATION METHOD, POWER STORAGE DEVICE AND POWER STORAGE METHOD, AND POWER CONTROL SYSTEM

CROSS REFERENCE TO RELATED APPLICATIONS

This is a U.S. National Stage Application under 35 U.S.C. §371, based on International Application No. PCT/JP2011/066219, filed Jul. 15, 2011, which claims priority to Japanese Patent Application JP 2010-166194, filed Jul. 23, 2010, each of which is hereby incorporated by reference in its entirety.

TECHNICAL FIELD

The present invention relates to a control device, a control method, a power generation device, a power generation method, a power storage device, a power storage method, and a power control system, and more particularly, to a control device, a control method, a power generation device, a power generation method, a power storage device, a power storage method, and a power control system that are capable of using generated power with higher efficiency.

BACKGROUND ART

Conventionally, power is generated using portable-type power generation devices using a solar power generation panel and the like, and small-size electronic devices such as cellular phones are charged.

However, in power generation devices used for individuals, there are many cases where the amount of generated power is small, and the stability is low, and thus, there is no device capable of sufficiently supplying power that is consumed by electronic devices such as a cellular phone, a portable music player, a notebook-type personal computer, and a game device of which the number continuously increases, and such devices are mainly used for a secondary use.

In contrast to this, a method of charging a secondary cell of a cellular phone by transmitting power-transmitting microwaves from a wireless base station has been considered (for example, see patent Document 1).

In addition, a method has been considered in which an antenna that irradiates electromagnetic waves is installed, and power is supplied in a wireless manner in a predetermined space near the antenna (for example, see patent Document 2).

Furthermore, a method has been considered in which the output of each electric power device is controlled based on remaining power of a plurality of electric power devices connected to a system (for example, see patent Document 3).

CITATION LIST

Patent Documents

Patent Document 1: Japanese Patent Application Laid-Open No. 2003-047177

Patent Document 2: Japanese Patent Application Laid-Open No. 2005-261187

Patent Document 3: Japanese Patent Application Laid-Open No. 2007-097373

SUMMARY OF THE INVENTION

Problems to be Solved by the Invention

However, according to such conventional methods, the power that is generated by a small-size portable power generation device, which is used for individuals, may not be used sufficiently and efficiently.

For example, in the case of the method disclosed in patent Document 1, a technology for transmitting and receiving microwaves having a high output level is necessary, and there is concern that it is difficult to implement the method in terms of development of facilities, the operating cost, and restriction conditions such as an installation place and use conditions.

In addition, in the case of the method disclosed in patent Document 2, charging can be performed only at places near the antenna, and there is concern that it is difficult to perform charging at an arbitrary place such as an outdoor place.

Furthermore, in the case of the method disclosed in patent Document 3, it is necessary to connect an electronic device to the system, and there is concern that it is difficult to perform charging at an arbitrary place such as an outdoor place.

In the case of portable electronic devices and the like, the sizes thereof tend to be small, and there are many cases where the amounts of charge of the secondary cells are relatively small. Accordingly, while it is preferable that environmental conditions necessary for charging such as a place and a time should be less as possibly as can be, and thus, effective uses of small-size portable power generation devices used for individuals have been requested, according to the conventional methods, it is difficult to effectively use such power generation devices.

The present invention is contrived in view of such situations, and an object thereof is to enable a more effective use of generated electric power.

Solutions to Problems

An aspect of the present invention is a control device that controls transmission and reception of electric power between a power generation device that generates electric power and a power storage device that stores electric power, including: a first acquiring unit that acquires first information that is information relating to a power generation status of the power generation device; a second acquiring unit that acquires second information that is information relating to a power storage state of the power storage device; a determining unit that determines the power storage device set as a power transmission destination of the electric power generated by the power generation device in accordance with the power generation status represented in the first information that has been acquired by the first acquiring unit and the power storage state represented in the second information that has been acquired by the second acquiring unit; a first supplying unit that supplies the power generation device as a power transmission source with a power transmission instruction for instructing to start transmitting the electric power to the power storage device determined by the determining unit as the power transmission destination; and a second supplying unit that supplies the power storage device determined by the determining unit as the power transmission destination with a power reception instruction for instructing to start receiving the electric power from the power generation device as the power transmission source.

The first information may include a current power generation output and a past power generation output history of the power generation device, and the determining unit may predict a power generation output for the future based on the current power generation output and the past power generation output history of the power generation device and determine the power storage device set as the power transmission destination in accordance with the prediction result.

The control device may further include: a determining unit that determines whether or not the power generation device can perform power transmission based on a power storage state of a power storing unit, the power generation device may include the power storing unit and performs power transmission after storing the generated electric power in the power storing unit, the first information may include information relating to the power storage state of the power storing unit, and the first supplying unit may supply the power transmission instruction only in a case where the power generation device is determined by the determining unit to be capable of performing power transmission.

The power generation device may include a power storing unit and performs power transmission after storing the generated electric power in the power storing unit, the first information may include information relating to a power storage state of the power storing unit and information representing a result of the determination whether or not the power generation device can perform power transmission, the determination having been performed based on the power storage state of the power storing unit, and the first supplying unit may supply the power transmission instruction only in a case where the power generation device is determined to be able to perform power transmission based on the information representing the result of the determination whether the power generation device can perform power transmission, the information being included in the first information acquired by the acquiring unit.

The control device may further include: a third acquiring unit that acquires information representing a result of a determination whether or not the power generation device can perform power transmission, the determination having been performed based on the power storage state of a power storing unit, the information being supplied from the power generation device in response to the power transmission instruction supplied by the first supplying unit, and the power generation device may include the power storing unit and performs power transmission after storing the generated electric power in the power storing unit.

The control device may further include: a managing unit that makes a prediction about reliability, a life, and the like of the power storing unit based on information relating to a usage history of the power storing unit and manages a maintenance schedule of a power storing unit, the power generation device may include the power storing unit and performs power transmission after storing the generated electric power in the power storing unit, and the first information may include information relating to the usage history of the power storing unit.

The control device may further include: an authentication unit that authenticates the power generation device using authentication individual information of the power generation device, and the first information may include the authentication individual information of the power generation device.

The first information may include information relating to a prediction of a next time at which the power generation device can perform power transmission, and the first supplying unit may supply the power transmission instruction at a time when the power generation device can perform power transmission next time based on the information relating to the prediction of the next time at which the power generation device can perform power transmission.

The first information may include position information of the power generation device, and the first supplying unit may supply the power transmission instruction only in a case where the power generation device is present at a power-transmittable position based on the position information of the power generation device.

The first information may include information that represents an operating state of a power transmitting unit included in the power generation device, and the first supplying unit may supply the power transmission instruction only in a case where the power transmitting unit is in a power-transmittable operating state based on the information that represents the operating state of the power transmitting unit.

The second information may include information relating to a current power storage state of a power storing unit included in the power storage device, and the determining unit may determine the power storage device set as the power transmission destination based on the information relating to the current power storage state of the power storing unit.

The second information may include information relating to a remaining operating time of a power consuming unit included in the power storage device that is based on a power storage amount of a power storing unit included in the power storage device, and the determining unit may determine the power storage device set as the power transmission destination based on the information relating to the remaining operating time of the power consuming unit.

The control device may further include: an authentication unit that authenticates the power storage device using authentication individual information of the power storage device, and the second information may include the authentication individual information of the power storage device.

The second information may include position information of the power storage device, and the second supplying unit may supply the power reception instruction only in a case where the power storage device is present at a power-receivable position based on the position information of the power storage device.

The second information may include information relating to an operating state of a power receiving unit included in the power storage device, and the second supplying unit may supply the power reception instruction only in a case where the power receiving unit is in a power-receivable operating state based on the information representing the operating state of the power receiving unit.

The determining unit may determine, as the power transmission destination, the power storage device that includes a power consuming unit that consumes the electric power generated by the power generation device.

The determining unit may determine the power storage device that includes a power storing unit having relatively high capacity as the power transmission destination.

Transmission and reception of electric power between the power storage devices may also be controlled, the determining unit may set the power storage device as the power transmission source and determine the power storage device set as the power transmission destination of the electric power stored in the power storage device as the power transmission source, and the first supplying unit may supply the power transmission instruction to the power storage device as the power transmission source.

The second acquiring unit may acquire, from another control device that controls a power generation device and a power storage device other than the power generation device and the power storage device that are controlled by the second acquiring unit, the second information of the power storage device controlled by the another control device, the determining unit may determine the power storage device set as the power transmission destination of the electric power that is generated by the power generation device in accordance with the power generation status represented in the first information that has been acquired by the first acquiring unit and the power storage state represented in the second information, which has been acquired by the second acquiring unit, of the power storage device that is controlled by the another control device, and the second supplying unit may supply the power reception instruction to the power storage device determined as the power transmission destination by the determining unit through the another control device.

The first acquiring unit may acquire, from another control device that controls a power generation device and a power storage device other than the power generation device and the power storage device that are controlled by the first acquiring unit, the first information of the power generation device controlled by the another control device, the determining unit may determine the power storage device set as the power transmission destination of the electric power that is generated by the power generation device in accordance with the power generation status represented in the first information, which has been acquired by the first acquiring unit, of the power generation device controlled by the another control device and the power storage state represented in the second information that has been acquired by the second acquiring unit, and the first supplying unit may supply the power transmission instruction to the power generation device as the power transmission source through the another control device.

The control device may further include: a mutual authentication unit that performs mutual authentication with another control device that controls a power generation device and a power storage device other than the power generation device and the power storage device that are controlled by the control device.

Another aspect of the present invention is a method of controlling a control device that controls transmission and reception of electric power between a power generation device that generates electric power and a power storage device that stores electric power, the method including: acquiring first information that is information relating to a power generation status of the power generation device by using a first acquiring unit of the control device; acquiring second information that is information relating to a power storage state of the power storage device by using a second acquiring unit of the control device; determining the power storage device set as a power transmission destination of the electric power generated by the power generation device in accordance with the power generation status represented in the acquired first information and the power storage state represented in the acquired second information by using a determining unit of the control device; supplying the power generation device as a power transmission source with a power transmission instruction for instructing to start transmitting the electric power to the power storage device that has been determined as the power transmission destination by using a first supplying unit of the control device; and supplying the power storage device determined as the power transmission destination with a power reception instruction for instructing to start receiving the electric power from the power generation device as the power transmission source by using a second supplying unit of the control device.

Another aspect of the present invention is a power generation device including: a power generating unit that performs power generation; an acquiring unit that acquires a power transmission instruction for instructing to start power transmission of the electric power from the control device that controls transmission and reception of the electric power that has been generated by the power generating unit and acquired; and a power transmitting unit that transmits the electric power, generated by the power generation unit and acquired, to another device that is designated as the power transmission destination in accordance with the power transmission instruction that has been acquired by the acquiring unit.

The power generation device may further include: a power storing unit that stores the electric power generated by the power generating unit and acquired, and the power transmitting unit may transmit the electric power that is stored in the power storing unit.

The power generation device may further include: a determining unit that determines whether or not power transmission can be performed by the power transmitting unit based on the power storage state of the power storing unit; and a supplying unit that supplies the control device with a determination result of the determining unit.

The power generation device may further include: a supplying unit that supplies the control device with information relating to the power generation status according to the power generating unit.

Another aspect of the present invention is a method of generating power using a power generation device, including: performing power generation by using a power generating unit of the power generation device; acquiring a power transmission instruction for instructing to start power transmission of the electric power from the control device that controls transmission and reception of the electric power that has been generated and acquired by using an acquiring unit of the power generation device; and transmitting the electric power, generated and acquired, to another device that is designated as the power transmission destination in accordance with the acquired power transmission instruction by using a power transmitting unit of the power generation device.

According to a further another aspect of the present invention, there is provided a power storage device including: an acquiring unit that acquires a power reception instruction for instructing to start power reception of electric power that is supplied from a power generation device from a control device that controls transmission and reception of electric power to and from the power generation device; a power receiving unit that receives electric power that is supplied from the power generation device designated as a power transmission source in accordance with the power reception instruction that is acquired by the acquiring unit; and a power storing unit that stores the electric power that is received by the power receiving unit.

The another device may be a power generation device.

The another device may be another power storage device having a power transmitting function for transmitting the electric power that is stored in the another device.

The power storage device may further include: a power consuming unit that consumes the electric power that has been stored by the power storing unit.

The power storage device may further include: a power transmitting unit that transmits, to another power storage device, the electric power that has been stored by the power storing unit.

The power storage device may further include: a supplying unit that supplies the control device with information relating to a power storage state according to the power storing unit.

Still another aspect of the present invention is a method of storing power using a power storage device, including: acquiring a power reception instruction for instructing to start power reception of electric power that is supplied from a power generation device from a control device that controls transmission and reception of electric power to and from the power generation device by using an acquiring unit of the power storage device; receiving the electric power that is supplied from the power generation device designated as a power transmission source in accordance with the acquired power reception instruction by using a power receiving unit of the power storage device; and storing the received electric power by using a power storing unit of the power storage device.

Still another aspect of the present invention is a power control system including: a power generation device that performs power generation; a power storage device that stores electric power; and a control device that controls transmission and reception of the electric power between the power generation device and the power storage device, the control device includes: a first acquiring unit that acquires first information that is information relating to a power generation status of the power generation device; a second acquiring unit that acquires second information that is information relating to a power storage state of the power storage device; a determining unit that determines the power storage device set as a power transmission destination of the electric power generated by the power generation device in accordance with the power generation status represented in the first information that has been acquired by the first acquiring unit and the power storage state represented in the second information that has been acquired by the second acquiring unit; a first supplying unit that supplies the power generation device as a power transmission source with a power transmission instruction for instructing to start transmitting the electric power to the power storage device determined by the determining unit as the power transmission destination; and a second supplying unit that supplies the power storage device determined by the determining unit as the power transmission destination with a power reception instruction for instructing to start receiving the electric power from the power generation device as the power transmission source, the power generation device includes: a power generating unit that performs power generation; a third supplying unit that supplies the control device with information relating to a power generation status according to the power generating unit; a third acquiring unit that acquires the power transmission instruction from the control device that has supplied the information relating to the power generation status of the power generating unit using the third supplying unit; and a power transmitting unit that transmits the electric power, generated by the power generation unit and acquired, to the power storage device that is designated as the power transmission destination in accordance with the power transmission instruction that has been acquired by the third acquiring unit, and the power storage device includes: a fourth supplying unit that supplies the control device with information relating to a power storage state; a fourth acquiring unit that acquires the power reception instruction from the control device that has supplied the information relating to the power storage state using the fourth supplying unit; a power receiving unit that receives the electric power that is supplied from the power generation device that is designated as a power transmission source in accordance with the power reception instruction acquired by the fourth acquiring unit; and a power storing unit that stores the electric power received by the power receiving unit.

According to an aspect of the present invention, the first information that is information relating to a power generation status of the power generation device is acquired, the second information that is information relating to a power storage state of the power storage device is acquired, the power storage device set as a power transmission destination of the electric power generated by the power generation device is determined in accordance with the power generation status represented in the acquired first information and the power storage state represented in the acquired second information, a power transmission instruction for instructing to start transmitting the electric power to the power storage device determined as the power transmission destination is supplied to the power generation device as a power transmission source, and a power reception instruction for instructing to start receiving the electric power from the power generation device as the power transmission source is supplied to the power storage device determined as the power transmission destination.

According to another aspect of the present invention, power generation is performed, a power transmission instruction for instructing to start transmitting the electric power is acquired from the control device that controls the transmission and reception of the electric power that is generated and acquired, and the electric power that is generated and acquired is transmitted to another device that is designated as a power transmission destination in accordance with the acquired power transmission instruction.

According to a further another aspect of the present invention, a power reception instruction for instructing to start receiving electric power that is supplied from the power generation device is acquired from the control device that controls the transmission and reception of electric power to and from the power generation device, the electric power supplied from the power generation device designated as the power transmission source in accordance with the acquired power reception instruction is received, and the received electric power is stored.

According to a still another aspect of the present invention, in a control device, first information that is information relating to the power generation status of the power generation device is acquired, second information that is information relating to the power storage state of the power storage device is acquired, the power storage device set as a power transmission destination of the electric power generated by the power generation device is determined in accordance with the power generation status represented in the acquired first information and the power storage state represented in the acquired second information, a power transmission instruction for instructing to start transmitting the electric power to the power storage device that is determined as the power transmission destination is supplied to the power generation device as a power transmission source, a power reception instruction for instructing to start receiving the electric power from the power generation device as the power transmission source is supplied to the power storage device determined as the power transmission destination, and, in the power generation device, power generation is performed, information relating to the power generation status is supplied to the control device, the power transmission instruction is acquired from the control device that supplies the information relating to the power generation status, the electric power that is generated and acquired is transmitted to the power storage device that is designated as the power transmission destination in accordance with the acquired power transmission instruction, and, in the power storage device, information relating to the power storage state is supplied to the control device, a power reception instruction is acquired from the control device that supplies the information relating to the power storage state, the electric power supplied from the power generation device designated as the power transmission source in accordance with the acquired power reception instruction is received, and the received electric power is stored.

Effects of the Invention

According to the present invention, generated power can be controlled. Especially, the generated power can be used with higher efficiency.

MODE FOR CARRYING OUT THE INVENTION

Hereinafter, embodiments of the present invention (hereinafter, referred to as embodiments) will be described. The description will be presented in the following order. 1. First Embodiment (Independent Personal Power System)

1. First Embodiment

Independent Personal Power System

The present invention relates to an energy system that is formed by a power generation device that is carried by an individual, a power storage device, a power transmission device, and a controller that controls such devices. First, an overview of the system will be described.

The energy system according to the present invention includes: one or more micro power generation devices that can be carried by an individual or be attached to the body; power transmitting devices that are accompanied with the power generation devices; a power storage device that can be carried by an individual or be attached to the body; a power reception device that is accompanied with the power storage device; a controller that controls such devices; and one or more portable electronic devices (consumption devices) that consume electric power.

The power storage device may be independently used or be built in each portable electronic device. The power generation device may independently include a small-capacity generated power storage device. Although it is preferable to perform the power transmission using the power transmission device in a wireless manner, the power transmission may be performed each time through a wired connection.

Other than that, the configuration of devices is arbitrary, and a plurality of devices described above may be included in one device, or a function that has not been described above may be included.

Figure 1:
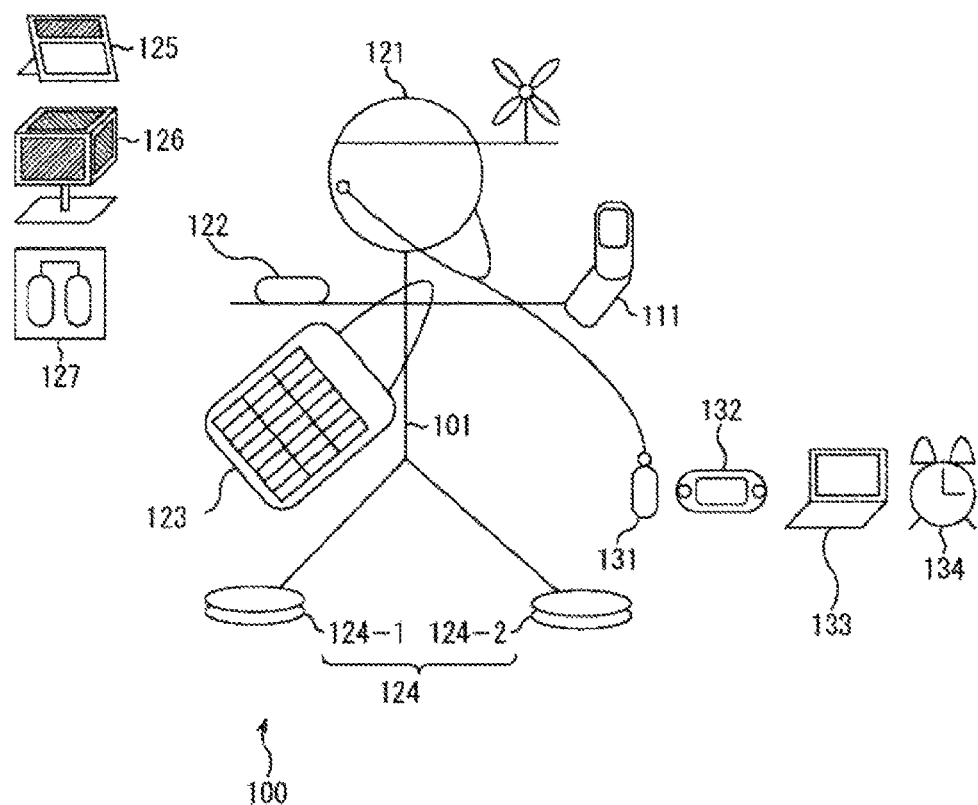
FIG. 1 is a diagram that illustrates a configuration example of an independent personal power system according to the present invention.

A specific example of the energy system will be described. FIG. 1 is a diagram that illustrates a configuration example of an independent personal power system according to the present invention.

The independent personal power system 100 illustrated in FIG. 1, which is mainly configured by devices that can be carried by a user 101, is an energy system that transmits and receives electric power between the devices held by the user 101. In other words, the independent personal power system 100 is an energy system that is completed in a small-scale range (the transmission and reception of electric power is performed only in a small-scale range) such as a household or a person. Accordingly, in the independent personal power system 100, a large-scale power supplying facilities such as commercial power supplies are not included.

As described above, the independent personal power system 100 includes the power generation device, the power transmission device, the power storage device, the power reception device, the controller, and the consumption devices. However, hereinafter, the power transmission device is assumed to be included in the power generation device, and the power reception device and the power consumption devices are assumed to be included in the power storage device.

As illustrated in FIG. 1, the independent personal power system 100 includes a cellular phone 111. This cellular phone 111 also has a function of the above-described controller, in addition to functions of an ordinary cellular phone such as a phone call and mail transmission and reception. In other words, the cellular phone 111 serves as the controller in the independent personal power system 100. Thus, the cellular phone 111 is also referred to as the controller 110.

The independent personal power system 100 includes a cap 121, an ornament 122, a bag 123, shoes 124, a photographing device 125, an illumination device 126, and a portable fuel cell 127. These have a power generating function and serves as the above-described power generation devices in the independent personal power system 100. Accordingly, in a case where these do not need to be discriminated from each other, these also will be referred to as power generation devices 120.

The cap 121 includes a propeller or the like and a power generating motor or the like and has a power generating function using wind power for generating electric power using the wind power that is received by the propeller or the like. The ornament 122 has a power generation function of converting electromagnetic waves generated on the periphery of a user 101 carrying the ornament 122 into electrical energy or a power generating function of converting the body temperature of the user 101 into electrical energy.

The bag 123 has a solar power generation panel on the surface thereof and has a power generation function of converting light energy into electrical energy. The shoes 124 are formed by a shoe 124-1 for a right foot and a shoe 124-2 for a left foot and have a power generation function of converting pressure that is applied to the shoe bottom into electrical energy. In other words, when the user 101 walks, runs, or jumps, pressure is applied to the shoe bottom of the shoes 124, whereby electric power is generated.

The cap 121 to the shoes 124 described above are the power generation devices 120 worn by the user.

The photographing device 125 and the illumination device 126 have solar power generation panels disposed therein and have a power generating function of converting light energy into electrical energy. The portable fuel cell 127 has a power generation function of extracting electric power through a chemical reaction between a negative-electrode active material and a positive-electrode active material that can be supplemented.

For example, the photographing device 125 to the portable fuel cell 127 are installed to a house or the like of the user 101 or are appropriately carried and are mainly individually used by the user 101.

Such power generation device 120 is a small-scale device that supplies electric power that is used by the consumption devices individually used by the user 101 and is not a large-scale power generation facility for an electric power company, a public facility, or the like that is used for many users. In addition, the power generation device 120 is not a facility that is used for selling electric power to an electric power company or the like.

The independent personal power system 100 further includes a music player 131, a game device 132, a notebook-type personal computer 133, and a clock 134. These have a power storing function and a power consuming function. In the independent personal power system 100, these serve as the above-described power storage devices. Thus, in a case where these do not need to be discriminated from each other, there will be also referred to as power storage devices 130.

The music player 131 has a secondary cell (including a detachably attached type) built therein and outputs a sound through a headphone or a speaker by performing reproduction of music data or the like using electric power that is stored in the secondary cell. The game device 132 has a secondary cell (including a detachably attached type) built therein and displays an image of a television game on a monitor or receives an operation of the user 101 for the game by executing a program using the power that is stored in the secondary cell.

The notebook-type personal computer 133 has a secondary cell (including a detachably attached type) built therein and realizes functions of a personal computer by executing a program or the like using the electric power that is stored in the secondary cell. The clock 134 has a secondary cell (including a detachably attached type) built therein and realizes functions such as a time display and a time alarm using the electric power that is stored in the secondary cell.

While some of these power storage devices 130 may be used by being installed to a house or the like of the user 101 when the power storage devices 130 can be carried and used by the user 101, all of them are mainly individually used for the user 101.

Such power storage devices 130 are devices that can be driven by power of a level that is stored in the secondary cell, even without being connected to a commercial power supply or the like.

Next, each device will be described.

[Controller]

Figure 2:
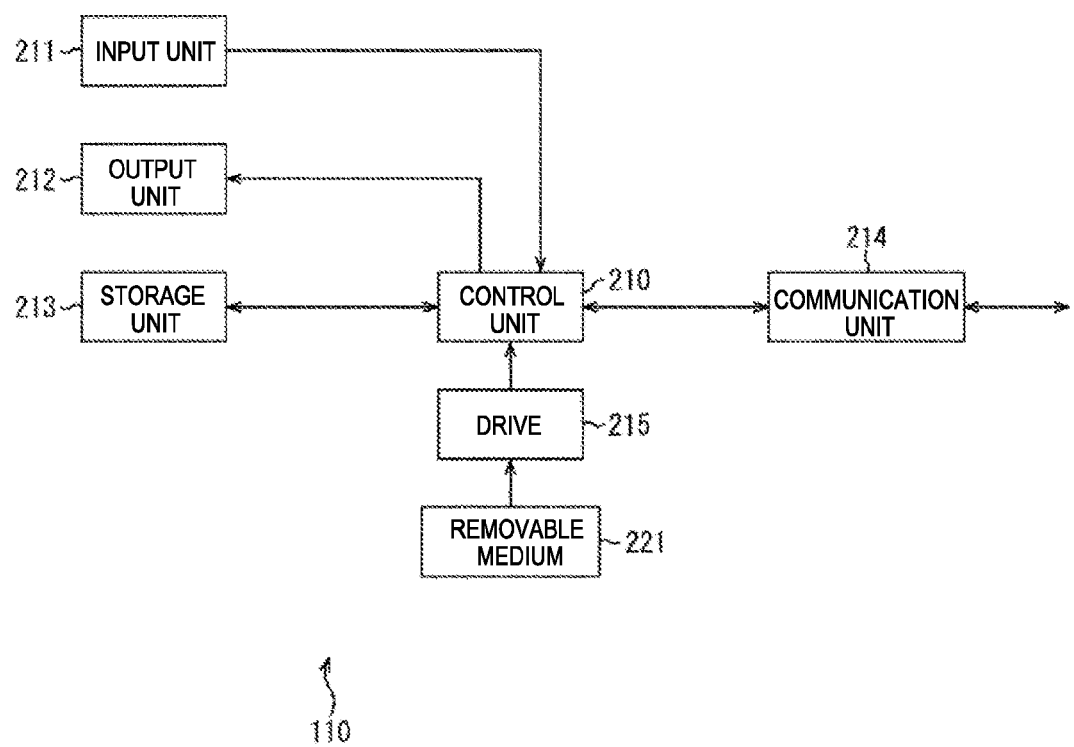
FIG. 2 is a block diagram that illustrates a configuration example of a controller according to the present invention.

First, the controller 110 will be described. FIG. 2 is a block diagram that illustrates a main configuration example of the controller 110. As illustrated in FIG. 2, the controller 110 includes a control unit 210, an input unit 211, an output unit 212, a storage unit 213, and a communication unit 214.

The control unit 210 includes a central processing unit (CPU), a read only memory (ROM), a random access memory (RAM), and the like, controls each unit of the controller 110 by executing a program or the like, and performs processes relating to the control of the power generation device 120 and the power storage device 130.

The input unit 211, for example, is formed by an arbitrary input device such as a keyboard, a mouse, buttons, or a touch panel or an input terminal, receives an input of information from the user 101 or the outside such as other devices, and provides the input information to the control unit 210.

The output unit 212 is formed by a display such as a cathode ray tube (CRT) display or a liquid crystal display (LCD), a speaker, an output terminal, or the like and provides the user 101 with information that is supplied from the control unit 210 as an image or a sound or outputs the information to other devices as a predetermined signal.

The storage unit 213, for example, is formed by a solid state drive (SSD) such as a flash memory, a hard disk, or the like and stores information that is supplied from the control unit 210 or supplies the stored information to the control unit 210.

The communication unit 214, for example, is formed by an interface, a modem, or the like of a wired local area network (LAN) or a wireless LAN and performs a process of communicating with other devices through a network that includes the Internet. For example, the communication unit 214, under the control of the control unit 210, communicates with the power generation device 120 or the power storage device 130 and receives information relating to the power generating status, the charged state, and the like or transmits control information such as a power transmission instruction or a power reception instruction. In addition, for example, the communication unit 214, under the control of the control unit 210, acquires a computer program through a network that includes the Internet and installs the computer program to the storage unit 213.

In addition, a drive 215 is connected to the controller 110 as is necessary, a removable medium 221 such as a magnetic disk, an optical disc, a magneto-optical disk, or a semiconductor memory is appropriately loaded therein, and a computer program that is read out from the removable medium is installed to the storage unit 213 as is necessary.

Actually, although the controller 110 includes a power storing unit (a primary cell, a secondary cell, or the like) that supplies power used for driving the control unit 210 to the drive 215 to each unit, it is not illustrated in the diagram.

The controller 110 basically controls the transmission and reception of power between the power generation device 120 and the power storage device 130. For example, the controller 110 controls whether to transmit power to (charge) a specific storage device (power reception device) 130 from a specific power generation device at a specific time by controlling the power generation device 120 (power transmission device). In addition, the controller 110 also controls the transmission and reception of power between the power storage devices 130.

In order to perform such control, the controller 110 acquires various kinds of information from the user 101, the power generation device 120, and the power storage device 130.

For example, the user 101 can perform settings as below through the input unit 211.

1) desired charge state of power storage device included in each device
2) priority level of use of each device
3) priority level of charging each device 4) manual power interchange between devices
5) user's action plan
6) learning user's action In a case where power transmission between devices is through a wired connection, the controller 110 recommends a power transmitting source and a power transmission connecting destination to the user 101 based on the above-described settings through the output unit 212. In other words, the controller 110 notifies the user 101 of a combination of devices to be connected using a wire that is recommended based on various settings or various statuses.

For example, when the user 101 sets input information 1) (desired charge state of power storage device included in each device) (defined charge state), the controller 110 monitors each power storage device 130 and performs control such that the transmission of power (charging) is performed with high priority for a power storage device having a charge state that is below the defined charge state. While the defined charge state may be set by an arbitrary parameter, for example, a setting that is based on a ratio of a charge state to a fully-charged state, a remaining operating time, or the like may be considered.

It is apparent that, in a case where the other settings of input information 2) and subsequent input information are made, the controller 110 controls the transmission and reception of power also in consideration of such settings.

For example, when the input information 5) (the action plan of the user 101) is set, the controller 110 can predict the use plan of each power storage device 130 (the consumption devices) to some degree based on the information (the action plan of the user 101) and charge the power storage device 130 with high priority.

The input information 6) (learning the action of the user 101) is for inputting a result of the action of the user 101, and the controller 110 learns an action pattern of the user 101 based on the information and uses the learning result for predicting a next action. At this time, the controller 110 may perform the prediction of an action based on a combination of the learning result and the other information such as input information 1) to input information 5).

In addition, input information 6) may be input without the user 101 being aware of it. For example, it may be configured such that the input unit 211 includes a position detecting sensor such as a GPS, and the control unit 210 analyzes or learns the result of the action of the user 101 based on position information that is detected by the sensor. It is apparent that arbitrary information other than the position information may be detected by the input unit 211 and be used for the analysis or the learning of the action result that is performed by the control unit 210. In addition, for example, it may be configured such that information of the operating conditions of the power generation device 120 and the power storage device 130 is acquired through the communication unit 214, and the action of the user 101 is analyzed or learned based on the information.

It is apparent that arbitrary information other than the above-described information may be input (set).

For example, the controller 110 may acquire arbitrary information through the Internet or the like. For example, the control unit 210 may acquire weather information or wind power information from a web site through the communication unit 214. The controller 110 can predict the power generation amount of a power generation device that performs photovoltaic power generation or wind power generation based on the weather information or the wind power information that has been acquired. In addition, the input information described above may be combined therewith so as to improve the prediction accuracy.

By the prediction of the amount of generated power, the controller 110 can perform control so as to realize the power transmission and power reception having higher efficiency.

As above, the controller 110 performs control based on the power generation amount of the power generation device 120, the power storage amount of the power storage device 130, and the information of the request, the action, or the like of the user 101, whereby power acquired by the power generation device 120 can be stored in the power storage device 130 with higher efficiency.

In addition, the controller 110 may control the transmission and reception of power between the power storage devices 130. For example, the controller 110 may perform control such as the interchange (movement) of power that is stored in the notebook-type personal computer 133 having a relatively large amount of the maximum charge capacity to the music player 131 having a relatively small amount of the maximum charge capacity or the like.

In addition, in FIG. 1, although the cellular phone 111 is represented as an example of the controller 110, the controller 110 may be realized as an arbitrary device such as a notebook-type personal computer as long as it has the above-described functions.

[Power Generation Device]

Next, the power generation device 120 will be described. As examples of the power generation device 120, there are an energy harvester that performs environmental power generation using sunlight, wind power, heat, vibrations, electric waves, or the like and a fuel cell that generates power using methanol, hydrogen, or the like. A solar cell that uses silicon as its material, a dye-sensitized solar cell that uses organic dye as its material, a wind power generation device using a small-size windmill, a thermoelectric conversion device using a Seebeck effect, and a vibration power generation device that converts vibrations into power using a piezoelectric device are representative examples thereof.

In addition, the power generation device does not need to be attached to a body and may be a small-size solar cell panel, a small-size windmill power generation device, or the like that is installed to a house or the like.

Figure 3:
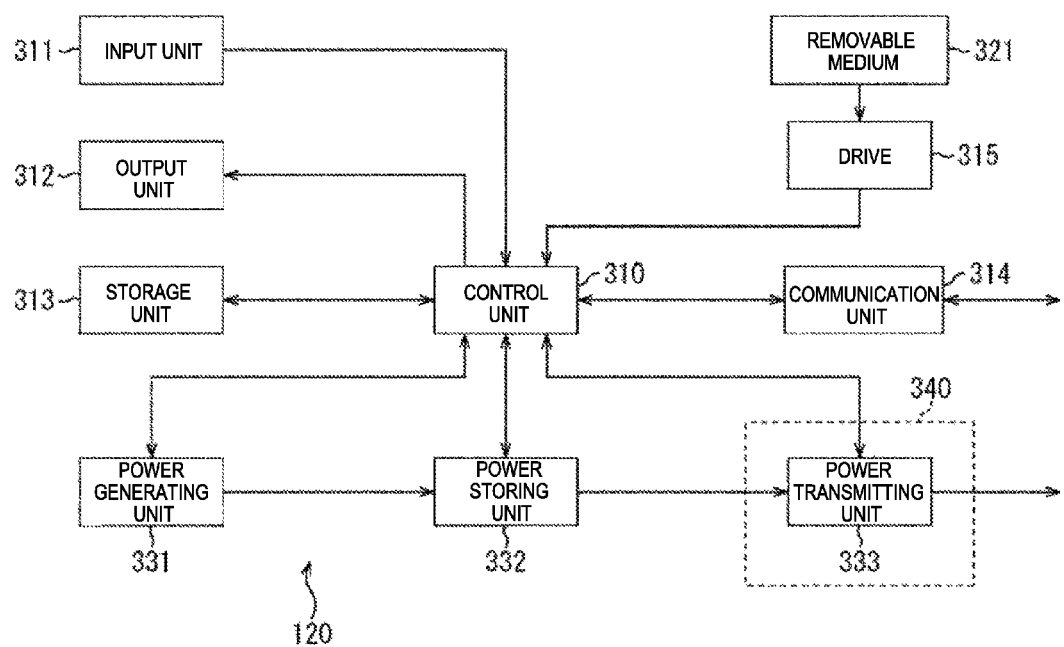
FIG. 3 is a block diagram that illustrates a configuration example of a power generation device according to the present invention.

FIG. 3 is a block diagram that illustrates a main configuration example of the power generation device 120. As illustrated in FIG. 3, the power generation device 120 includes a control unit 310, an input unit 311, an output unit 312, a storage unit 313, a communication unit 314, a power generating unit 331, a power storing unit 332, and a power transmitting unit 333.

The control unit 310 includes a CPU, a ROM, a RAM, and the like and performs processes relating to the generation of power and the transmission of power by controlling each unit of the power generation device 120 by executing a program or the like.

The input unit 311, for example, is formed by an arbitrary input device such as a keyboard, a mouse, buttons, or a touch panel or an input terminal, receives an input of information from the user 101 or the outside such as other devices, and provides the input information to the control unit 310.

The output unit 312 is formed by a display such as a CRT display or a LCD, a speaker, an output terminal, or the like and provides the user 101 with information that is supplied from the control unit 310 as an image or a sound or outputs the information to other devices as a predetermined signal.

The storage unit 313, for example, is formed by an SSD such as a flash memory, a hard disk, or the like and stores information that is supplied from the control unit 310 or supplies the stored information to the control unit 310.

The communication unit 314, for example, is formed by an interface of a wired LAN or a wireless LAN, a modem, or the like and performs a process of communicating with other devices through a network that includes the Internet. For example, the communication unit 314, under the control of the control unit 310, communicates with the controller 110 or the power storage device 130 and receives information relating to the power generating status and the like or transmits control information such as a power transmission instruction. In addition, for example, the communication unit 314, under the control of the control unit 310, acquires a computer program through a network that includes the Internet and installs the computer program to the storage unit 313.

In addition, a drive 315 is connected to the power generation device 120 as is necessary, a removable medium 321 such as a magnetic disk, an optical disc, a magneto-optical disk, or a semiconductor memory is appropriately loaded therein, and a computer program that is read out from the removable medium is installed to the storage unit 313 as is necessary.

The power generating unit 331, for example, includes a device that is represented by a solar cell panel that uses silicon or organic dye as its material, a wind power generation device using a small-size windmill, a thermoelectric conversion device using a Seebeck effect, or a piezoelectric device and has a function of converting arbitrary energy into electrical energy. The power generating unit 331, under the control of the control unit 310, generates electric power and supplies the acquired electric power to the power storing unit 332.

The power storing unit 332, for example, includes a small-size lithium ion battery, a capacitor, or a condenser and temporally stores electric power that is generated by the power generating unit 331 under the control of the control unit 310. Although the power storing unit 332 may not be provided, there are many cases where the electric power generated by the power generating unit 331 is basically low and unstable. Accordingly, by temporarily storing the electric power in the power storing unit 332 instead of directly transmitting the electric power, stable transmission of power can be made for relatively high electric power, whereby the transmission of power can be performed with higher efficiency.

The power storing unit 332, under the control of the control unit 310, supplies the stored electric power to the power transmitting unit 333 at predetermined timing. In addition, the electric power that is stored by the power storing unit 332 is appropriately supplied to the control unit 310 to the drive 315 and the power generating unit 331 as power used for driving each unit.

The power transmitting unit 333, under the control of the control unit 310, transmits the electric power that is supplied from the power storing unit 332 to a power storage device 130 that is designated as a power transmission destination. This transmission of the electric power may be performed in a wired manner or a wireless manner.

In addition, the power transmitting unit 333 has a function of transmitting the electric power to the power reception device and thus may be configured as an independent device other than the power generation device 120, as a power transmission device 340. Furthermore, the input unit 311 may not be provided.

In FIG. 1, as an example of the power generation device 120, although the cap 121 to the portable fuel cell 127 are illustrated, the power generation device 120 may be realized as any device, as long as the device has a power generating function.

[Power Storage Device]

Next, the power storage device 130 will be described. The power storage device 130 includes a secondary cell that is formed, for example, by a lithium ion battery, a nickel-metal hydride battery, or a capacitor as a power storing function for storing electric power. In addition, the power storage device 130 also includes a power consuming function for consuming the stored electric power.

Figure 4:
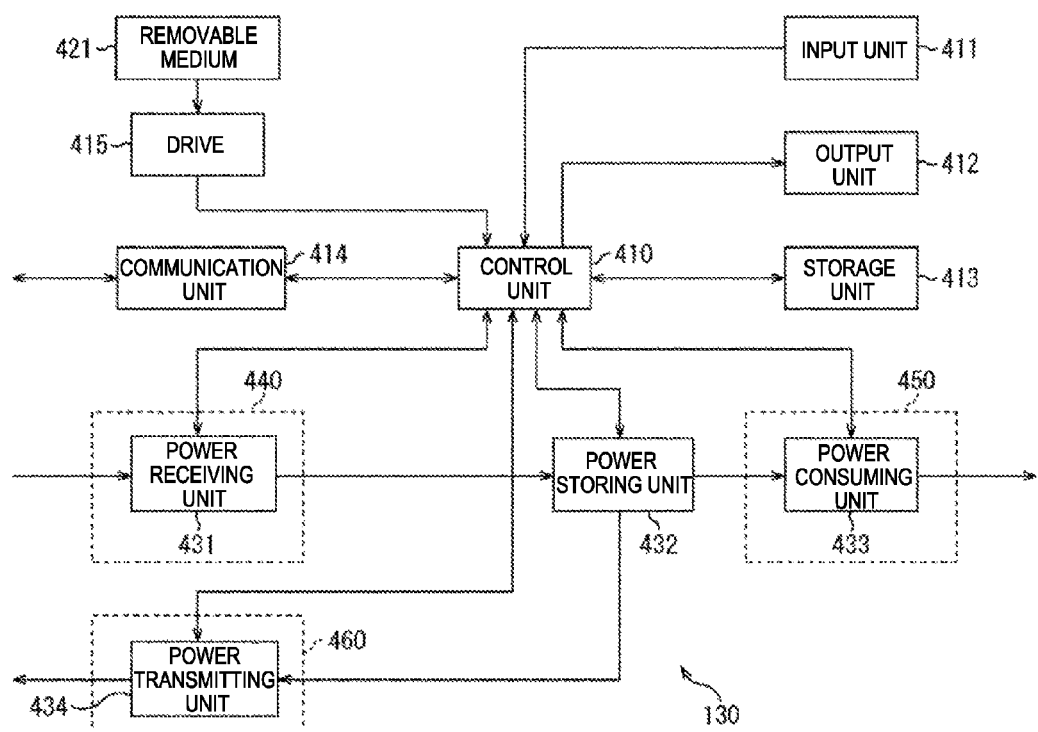
FIG. 4 is a block diagram that illustrates a configuration example of a power storage device according to the present invention.

FIG. 4 is a block diagram that illustrates a main configuration example of the power storage device 130. As illustrated in FIG. 4, the power storage device 130 includes a control unit 410, an input unit 411, an output unit 412, a storage unit 413, a communication unit 414, a power receiving unit 431, a power storing unit 432, a power consuming unit 433, and a power transmitting unit 434.

The control unit 410 includes a CPU, a ROM, a RAM, and the like and performs processes relating to the generation of power and the transmission of power by controlling each unit of the power storage device 130 by executing a program or the like.

The input unit 411, for example, is formed by an arbitrary input device such as a keyboard, a mouse, buttons, or a touch panel or an input terminal, receives an input of information from the user 101 or the outside such as other devices, and provides the input information to the control unit 410.

The output unit 412 is formed by a display such as a CRT display or a LCD, a speaker, an output terminal, or the like and provides the user 101 with information that is supplied from the control unit 410 as an image or a sound or outputs the information to other devices as a predetermined signal.

The storage unit 413, for example, is formed by an SSD such as a flash memory, a hard disk, or the like and stores information that is supplied from the control unit 410 or supplies the stored information to the control unit 410.

The communication unit 414, for example, is formed by an interface of a wired LAN or a wireless LAN, a modem, or the like and performs a process of communicating with other devices through a network that includes the Internet. For example, the communication unit 414, under the control of the control unit 410, communicates with the controller 110 or the power generation device 120 and receives information relating to the power storing status and the like or transmits control information such as a power transmission instruction. In addition, for example, the communication unit 414, under the control of the control unit 410, acquires a computer program through a network that includes the Internet and installs the computer program to the storage unit 413.

In addition, a drive 415 is connected to the power storage device 130 as is necessary, a removable medium 421 such as a magnetic disk, an optical disc, a magneto-optical disk, or a semiconductor memory is appropriately loaded therein, and a computer program that is read out from the removable medium is installed to the storage unit 413 as is necessary.

The power receiving unit 431, under the control of the control unit 410, receives electric power that is supplied from the power generation device 120 designated as a power transmission source or another power storage device 130 and supplies the received electric power to the power storing unit 432. In addition, the power receiving unit 431 has a function of receiving electric power from the power transmission device and thus, may be configured as an independent device other than the power storage device 130, as a power reception device 440.

The power storing unit 432, for example, includes a secondary cell that is formed by a lithium ion battery, a nickel-metal hydride battery, a capacitor, or the like and stores the electric power that is received by the power receiving unit 431 under the control of the control unit 410. In addition, the power storing unit 432, under the control of the control unit 410, supplies the stored electric power to the power consuming unit 433. Furthermore, the electric power that is stored by the power storing unit 432 is appropriately supplied to the control unit 410 to the drive 415 as power that is used for driving each unit.

The power consuming unit 433, under the control of the control unit 410, is driven using the electric power that is supplied from the power storing unit 432, thereby realizing the function of an electronic device. For example, in the case of the music player 131, the power consuming unit 433 performs a process of reproducing music data and outputting a sound and the like. Further, for example, in the case of the game device 132, the power consuming unit 433 executes a program or performs a process of displaying an image of a television game and outputting a sound, or the like. In addition, for example, in the case of the notebook-type personal computer 133, the power consuming unit 433 executes a program, performs communication, or performs a process of displaying an image, outputting a sound, or the like. Furthermore, in the case of the clock 134, the power consuming unit 433 performs a process of performing a time keeping operation, a time display, time alarm, and the like.

In addition, the power consuming unit 433 has a function of consuming the electric power and thus may be configured as an independent device other than the power storage device 130, as a consumption device 450.

The power transmitting unit 434, under the control of the control unit 410, transmits the electric power that is supplied from the power storing unit 432 to another power storage device 130 that is designated as a power transmission destination. This transmission of the electric power may be performed in a wired manner or a wireless manner.

In addition, the power transmitting unit 434 has a function of transmitting the electric power to another power reception device and thus may be configured as an independent device other than the power storage device 130, as a power transmission device 460. This power transmitting unit 434 may not be provided. The power storage device 130 in such a case, naturally, does not have the power transmitting function and cannot supply electric power to another power storage device 130. In addition, the input unit 411 may not be provided.

Furthermore, in FIG. 1, as examples of the power storage device 130, while the music player 131 to the clock 134 are illustrated, the power storage device 130 may be realized as any device as long as the device has a power storing function.

[Inter-Device Communication]

The controller 110, the power generation device 120, and the power storage device 130 perform communication based on a predetermined communication standard such as ZigBee (registered trademark).

For example, the controller 110 and the power generation device 120 transmit and receive information as represented below.

1) The power generation state of each power generation device

2) The power storage state of the generated power storage device (power storing unit 332) that is accompanied with each power generation device 3) An instruction for power transmission from the controller In addition, for example, the controller 110 and the power storage device 130 transmit and receive information as below.

1) The states (a voltage, a current, a temperature, a degraded state, a power storage amount (mWh, mAh, or the like), a power storage amount ratio (%) (a power storage ratio (%) with respect to the whole capacity), and the like) of each power storage device 2) A charging instruction transmitted from the controller 3) A discharging instruction transmitted from the controller The power generation devices 120 and the power storage device 130 that are controlled by the controller 110 are registered in the controller 110 in advance. In other words, the controller 110 manages the power generation devices 120 and the power storage device 130 that transmit or receive power and can prohibit the supply of power from an unauthorized power generation device or the supply of power to an authorized power storage device. In other words, through the control process of the controller 110, the transmission or the reception of power that is not permitted by the user 101 may be configured not to be performed.

Accordingly, the power generation device 120 (power transmission device) and the power storage device 130 (power reception device) that are controlled and monitored by the controller 110 are defined, and electric power that is transmitted from the power generation device 120 can be appropriately received by the power storage device 130, whereby a theft of generated power and erroneous reception of power having low quality can be prevented.

[Power Generation Information 1]

Between the controller 110 and the power generation device 120, power generation information relating to power generation is transmitted and received. Examples of the power generation information that is supplied from the power generation device 120 to the controller 110 include a current generated-power output (W) and a past generated-power output history. Accordingly, the control unit 210 can predict the generated power output in the future and can perform planned power transmission and reception and manage power consumption of each power storage device 130 (consumption device) through the communication unit 214. In addition, the time degradation of the power generation device 120 can be diagnosed.

In addition, for example, the power generation information that is supplied from the power generation device 120 to the controller 110 includes a power storage amount (Wh) or a power storage ratio (%) (information relating to the current power storage state of the power storing unit 332) of the power storage device (power storing unit 332) that is accompanied with the power generation device 120. Accordingly, the control unit 210 determines whether to transmit power from the power generation device 120 that has supplied the power generation information and can perform more appropriate power transmission control for the power generation device 120 through the communication unit 214.

Furthermore, for example, the power generation information that is supplied from the power generation device 120 to the controller 110 includes information (information relating to a use history of the power storing unit 332) of the used number of cycles, a used time, or the like of the power storing unit 332. Accordingly, the control unit 210 can predict the reliability, the life, and the like of the power storing unit 332. In addition, based on this information, the control unit 210 can also manage a maintenance schedule of the power storing unit 332.

In addition, for example, the power generation information that is supplied from the power generation device 120 to the controller 110 includes authentication individual information of the power generation device 120 (identification information or the like of the power generation device 120). Accordingly, the control unit 210 recognizes that the power generation device 120 is registered in advance and can perform control for safe power transmission and reception through the communication unit 214.

Furthermore, for example, the power generation information that is supplied from the power generation device 120 to the controller 110 includes information relating to the prediction of a next time at which the power generation device 120 can transmit the electric power. Accordingly, the control unit 210 can acquire the information of a next power-transmittable time and can perform more planned control of the power transmission and reception through the communication unit 214. In addition, by using this information, the control unit 210 can more appropriately manage the power consumption of each power storage device 130 through the communication unit 214.

In addition, for example, the power generation information that is supplied from the power generation device 120 to the controller 110 includes position information of the power generation device 120. Accordingly, the control unit 210 can determine whether or not the power generation device 120 is in a power-transmittable and receivable range.

Furthermore, for example, the power generation information that is supplied from the power generation device 120 to the controller 110 includes the operating state of the power transmitting unit 333. Accordingly, the control unit 210 can determine whether or not the power generation device 120 is in a power-transmittable state.

In addition, the power generation information that is supplied from the power generation device 120 to the controller 110 may include only a part of the above-described various kinds of information. Furthermore, information other than that described above may be included.

[Power Generation Information 2]

The power generation information that is supplied from the controller 110 to the power generation device 120, for example, includes authentication individual information of the controller 110 (identification information or the like of the controller 110). Accordingly, the control unit 310 recognizes that the controller 110 has been registered in advance (the controller is not an unauthorized controller 110) by authenticating the controller 110 and can perform control for safe power transmission. In other words, the power generation device 120 can suppress a theft of electric power using an unauthorized controller 110 and an unauthorized power storage device 130.

In addition, the power generation information that is supplied from the controller 110 to the power generation device 120, for example, includes a power transmission instruction that is an instruction for supplying electric power. Based on this instruction, the control unit 310 can start the transmission of electric power by controlling the power transmitting unit 333.

Furthermore, the power generation information that is supplied from the controller 110 to the power generation device 120, for example, includes individual information of the power storage device 130 (information relating to the power storage device 130, the power reception device 440, or the consumption device 450). In this individual information, for example, identification information used for identifying the power storage device 130, information relating to the function (the configuration, the specifications, or the like) of the power storage device 130, and the like are included. Based on this information, the control unit 310 can control the power transmitting unit 333 so as to appropriately transmit electric power to a correct power storage device 130.

The power generation information that is supplied from the controller 110 to the power generation device 120, for example, includes information that represents a balance between the power generation amount and the power consumption amount. In the case of the power generation device 120 (a fuel cell or the like) that can adjust the power generation amount, the control unit 310 can control the power generating unit 331 such that the power generation output has an appropriate amount based on this information.

Furthermore, the power generation information that is supplied from the controller 110 to the power generation device 120 may include only a part of the above-described various kinds of information. Furthermore, information other than that described above may be included.

[Power Consumption Information 1]

Between the controller 110 and the power storage device 130, power consumption information relating to power consumption is transmitted and received. The power consumption information that is supplied from the power storage device 130 to the controller 110, for example, includes a power storage amount (Wh) or a power storage ratio (%) (information relating to the current power storage state of the power storing unit 432) of the power storing unit 432 of the power storage device 130. Accordingly, the control unit 210 can determine a power transmission destination of power transmitted from the power generation device 120 more appropriately.

In addition, the power consumption information that is supplied from the power storage device 130 to the controller 110, for example, includes a remaining operating time (hours, minutes, or the like) of the power consuming unit 433 that is based on the power storage amount of the power storing unit 432. Accordingly, the control unit 210 can determine a power transmission destination of power transmitted from the power generation device 120 more appropriately.

Furthermore, the power consumption information that is supplied from the power storage device 130 to the controller 110, for example, includes authentication individual information of the power storage device 130 (identification information or the like of the power storage device 130). Accordingly, the control unit 210 recognizes that the power storage device 130 is registered in advance and can perform control for safe power transmission and reception through the communication unit 214.

In addition, the power consumption information that is supplied from the power storage device 130 to the controller 110, for example, includes position information of the power storage device 130. Accordingly, the control unit 210 can determine whether or not the power storage device 130 is in a power-transmittable and receivable range.

Furthermore, the power consumption information that is supplied from the power storage device 130 to the controller 110, for example, includes the operating state of the power receiving unit 431. Accordingly, the control unit 210 can determine whether or not the power storage device 130 is in a power-receivable state.

In addition, the power consumption information that is supplied from the power storage device 130 to the controller 110 may include only a part of the above-described various kinds of information. Furthermore, information other than that described above may be included.

[Power Consumption Information 2]

The power consumption information that is supplied from the controller 110 to the power storage device 130, for example, includes a power reception instruction that is an instruction for acquiring electric power. Based on this instruction, the control unit 410 can start the reception of electric power by controlling the power receiving unit 431.

Furthermore, the power consumption information that is supplied from the controller 110 to the power storage device 130, for example, includes individual information of the power generation device 120 (information relating to the power transmission device 340). In this individual information, for example, identification information used for identifying the power generation device 120, information relating to the function (the configuration, the specifications, or the like) of the power generation device 120, and the like are included. Based on this information, the control unit 410 can control the power receiving unit 431 so as to appropriately receive electric power from a correct power generation device 120.

The power consumption information that is supplied from the controller 110 to the power storage device 130, for example, includes information that represents a balance between the power generation amount and the power consumption amount. In the case of the power storage device 130 that can adjust the power consumption amount, the control unit 410 can control the power consuming unit 433 such that the power consumption output has an appropriate amount based on this information.

Furthermore, the power consumption information that is supplied from the controller 110 to the power storage device 130 may include only a part of the above-described various kinds of information. Furthermore, information other than that described above may be included.

[Direct Power Supply]

As methods of supplying power from the power generation device 120 to the power storage device 130, there are two kinds of methods including direct power supply and indirect power supply. The direct power supply is a method in which electric power that is generated by the power generation device 120 is transmitted to the power storing unit 432 of the power storage device 130 that has the power consuming unit 433 that consumes the electric power.

In contrast to this, the indirect power supply is a method in which electric power generated by the power generation device 120 is transmitted to the power storing unit 432 of a power storage device 130 other than the power storage device 130 that has the power consuming unit 433 that consumes the electric power at once and stored, and, thereafter, is retransmitted to the power storing unit 432 of the power storage device 130 that has the power consuming unit 433 that consumes the electric power at predetermined timing.

Figure 5:
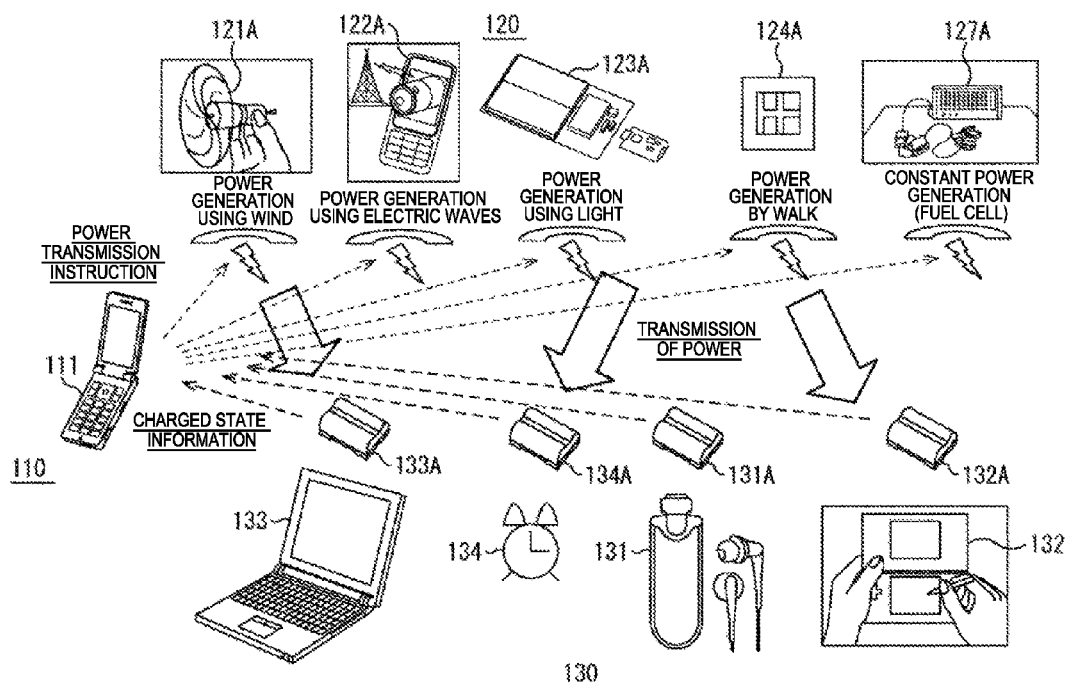
FIG. 5 is a diagram that illustrates an example of direct power supply.

First, the direct power supply will be described. FIG. 5 is a diagram that illustrates an example of the appearance of the direct power supply. The controller 110 determines a power transmission destination for each power generation device 120 based on the information relating to the current charge state of the power storing unit 432 of each power storage device 130, which is collected from each power storage device 130, and appropriately transmits a power transmission instruction to each power generation device 120.

In FIG. 5, as examples of the power generating unit 331 of the power generation device 120, a power generating unit 121A of the cap 121, a power generating unit 122A of the ornament 122, a power generating unit 123A of the bag 123, a power generating unit 124A of the shoes 124, and a power generating unit 127A of the portable fuel cell 127 are illustrated. Although not illustrated in the diagram, it is apparent that a power generating unit of the photographing device 125 and a power generating unit of the illumination device 126 are included in control targets.

In addition, in FIG. 5, as examples of the power storing unit 432 of the power storage device 130, a power storing unit 131A of the music player 131, a power storing unit 132A of the game device 132, a power storing unit 133A of the notebook-type personal computer 133, and a power storing unit 134A of the clock 134 are illustrated.

Furthermore, in FIG. 5, as an example of the controller 110, the cellular phone 111 is illustrated.

The cellular phone 111 acquires information relating to the power storage states of the power storing units 131A to 134A and the like and determines power transmission destinations of electric power generated by the power generating units 121A to 127A based on such information, for example, as denoted by white arrows.

In addition, as methods of transmitting power for the power supply, there are two kinds of methods including power transmission performed in a wireless manner and power transmission performed in a wired manner. First, an example of the flow of the wireless direct power supply process that is performed by the controller 110 will be described with reference to a flowchart illustrated in FIG. 6.

When this process is started, the control unit 210, in Step S101, communicates with each power generation device 120 through the communication unit 214, receives power generation information transmitted from each power generation device 120, and authenticates each power generation device 120.

In a case where the charging amount of the power storing unit 332 included in each power generation device 120 exceeds a predetermined amount (for example, 90% of the capacity of the power storing unit 332, LIB 4.05 V or more, or the like), the control unit 310 transmits power generation information that notifies the controller 110 such an indication by controlling the communication unit 314. Accordingly, the amount of power that is determined by the power generation device 120 can be transmitted, whereby the transmission efficiency can be improved.

In addition, such a process may be started by requesting each power generation device 120 to transmit the power generation information using the controller 110.

In Step S102, the control unit 210 determines whether or not power can be transmitted from each power generation device 120 based on the acquired power generation information. For example, in a case where it is determined that there is no power generation device 120 that can transmit power since the charging amount of the power storing unit 332 of the power generation device 120 is less than a predetermined threshold, the power generation device 120 is not present at a power-transmittable position, or the power generation device 120 is not in the operating state in which power can be transmitted, the control unit 210 returns the process to Step S101.

In addition, in Step S102, in a case where the charging amount of the power storing unit 332 of the power generation device 120 is larger than the predetermined threshold, the power generation device 120 is present at a power-transmittable area, and the power generation device 120 is in an operating state in which power can be transmitted, it is determined that there is a power generation device 120 that can transmit power, and the process proceeds to Step S103.

In Step S103, the control unit 210 communicates with each power storage device 130 through the communication unit 214, receives power consumption information transmitted from each power generation device 120, and authenticates each power storage device 130.

The control unit 210 notifies the user 101 of information that represents the status of the power generation device 120 or the power storage device 130 through the output unit 212.

In Step S104, the user 101, for example, inputs designation of a power transmission source or a power transmission destination, a power transmission starting instruction, settings, a request, or the like by operating the input unit 211. In addition, the communication unit 214 appropriately acquires information of the weather or the like under the control of the control unit 210.

In Step S105, the control unit 210 selects a (power storing unit 432 of) a power storage device 130 that is a power transmission destination of electric power based on the user's input.

In Step S106, the control unit 210 notifies the user through the output unit 212 so as to bring the power transmission device (power generation device 120) and the power reception device (power storage device 130) to be close to each other. For example, the control unit 210 displays a message urging the user to bring the power transmission device (power generation device 120) and the power reception device (power storage device 130) to be close to each other within a distance (within a power transmittable distance) at which power can be transmitted and received on the monitor or outputs a voice message through the speaker.

In Step S107, the control unit 210 determines whether or not the power storage device 130 is in a power-receivable state based on the acquired power consumption information and the like. For example, in a case where it is determined that the power storage amount of the power storing unit 432 is smaller than a predetermined threshold, there is sufficient vacant capacity, the power storing unit is present at a power-receivable position, there is a power storage device 130 that is in an operating state in which power can be received, and there is a power storage device 130 that is in the power receivable state, the control unit 210 causes the process to proceed to Step S108.

In Step S108, the control unit 210 determines whether or not the power transmission device (power generation device 120) and the power reception device (power storage device 130) that transmit and receive electric power are located within a power-transmittable distance. In a case where both devices are determined to be close to each other within the power-transmittable distance based on the position information of the power transmission device and the power reception device, the control unit 210 causes the process to proceed to Step S109.

In Step S109, the control unit 210 transmits power generation information including a power transmission instruction for transmitting power to the power storage device 130 that is selected as a power transmission destination by the process of Step S105 to the power generation device 120 that is set as a power transmission source of the electric power through the communication unit 214. In addition, the control unit 210 transmits power consumption information that includes a power reception instruction for receiving power from the power generation device 120 that is the power transmission source of the electric power to the power storage device 130 that is set as the power transmission destination of electric power through the communication unit 214.

The power generation device 120 that is designated as the power transmission source transmits electric power in accordance with the power transmission instruction that is included in the power generation information. In addition, the power storage device 130 designated as the power transmission destination receives the electric power in accordance with the power reception instruction that is included in the power consumption information.

When the instruction is transmitted, the controller 110 ends the wireless direct power supply process. In addition, in Step S107, for example, in a case where it is determined that the power storage amount of the power storing unit 432 is smaller than a predetermined threshold, there is sufficient vacant capacity, the power storing unit is present at a power-receivable position, and there is no power storage device 130 that is in an operating state in which power can be received, in other words, in a case where it is determined that there is no power storage device 130 that is in a power-receivable state, the control unit 210 ends the wireless direct power supply process.

In addition, in Step S108, in a case where the power transmission device and the power reception device that transmit and receive electric power are determined not to be close to each other so as to be within the power transmittable distance, the control unit 210 ends the wireless direct power supply process.

By performing the above-described process, the controller 110 can control the wireless direct power supply, whereby the electric power can be appropriately supplied.

In addition, the selection of the power storage device 130 in the process of Step S105 may be performed by the control unit 210 based on the power generation information or the power consumption information that has been collected. For example, the control unit 210 designates a power storage device 130 having a smallest remaining amount of charging or a power storage device 130 having a shortest operable time that is calculated based on the power storage remaining amount as a power transmission destination.

As above, although the determination whether or not the power generation device transmits electric power has been described to be made by the controller 110, the present invention is not limited thereto, and, for example, the power generation device may make the determination. In such a case, the determination result may be included in the power generation information that is collected by the controller 110. In addition, as a response to a power transmission instruction, the power generation device may supply the determination result to the controller 110.

Next, wired power supply will be described. An example of the flow of a wired direct power supply process that is performed by the controller 110 will be described with reference to a flowchart illustrated in FIG. 7.

Figure 6:
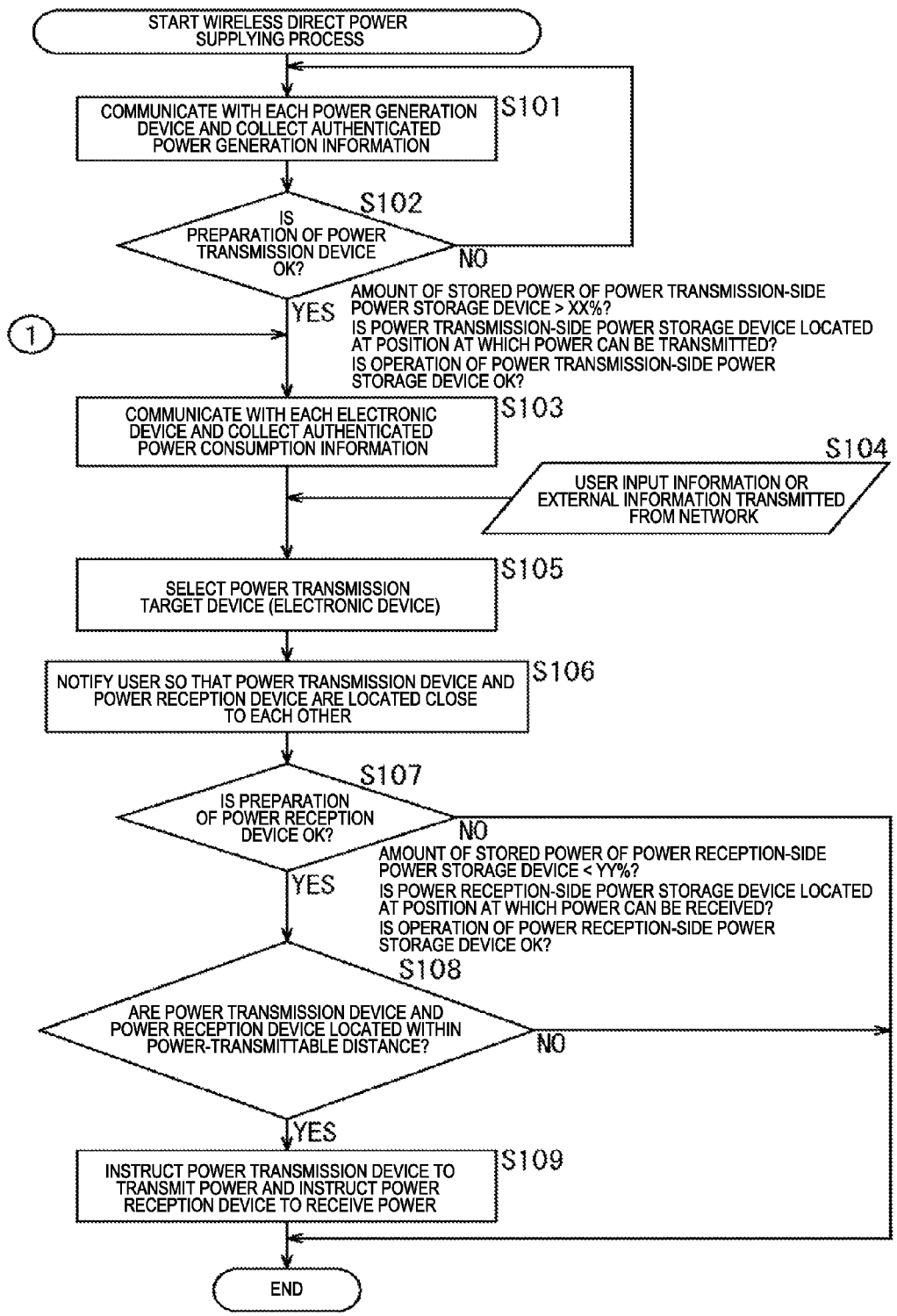
FIG. 6 is a flowchart that illustrates an example of a flow of a wireless direct power supplying process.
Figure 7:
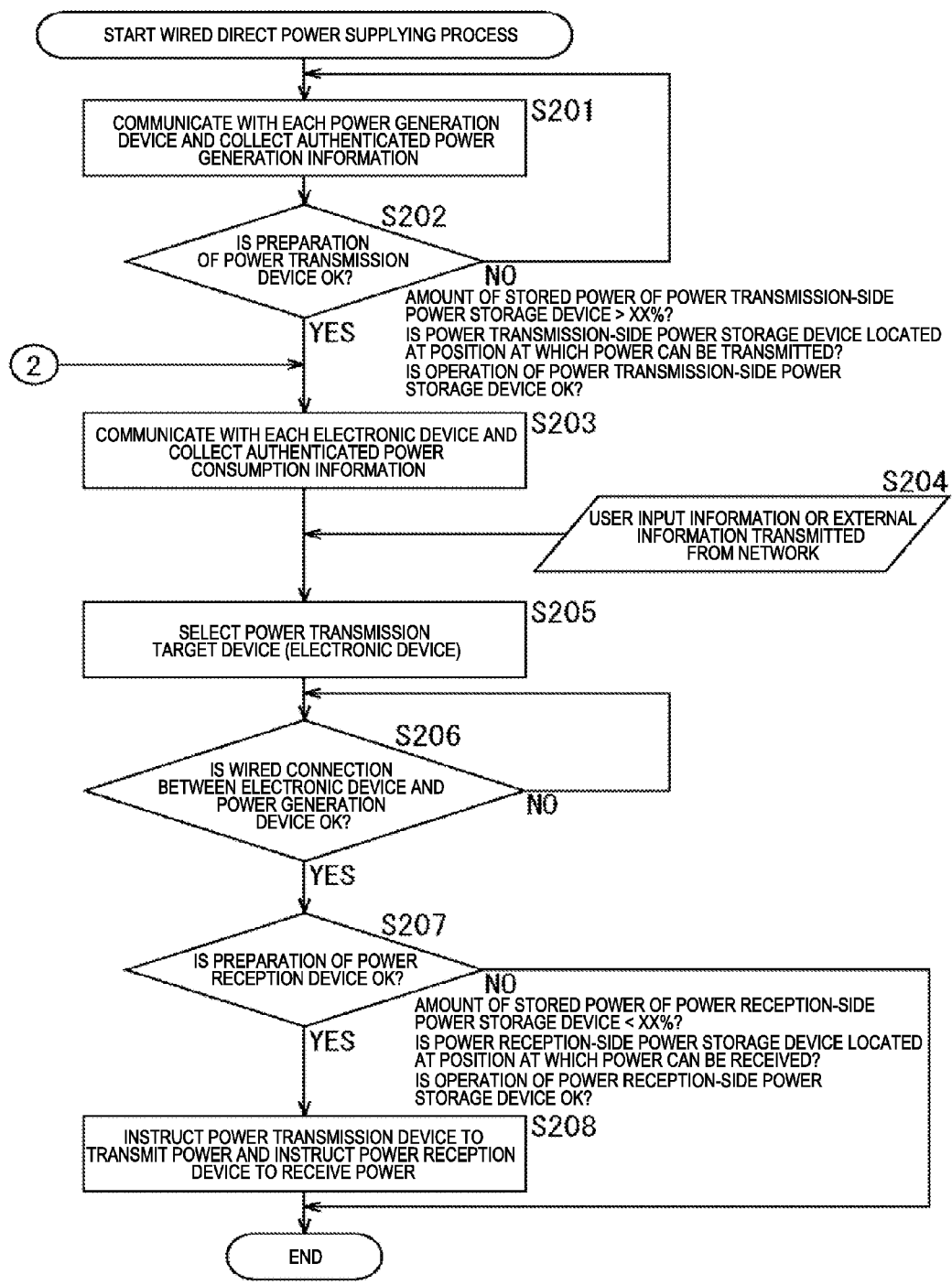
FIG. 7 is a flowchart that illustrates an example of a flow of a wired direct power supplying process.

As illustrated in FIG. 7, also in the wired case, basically, each process is performed similarly to that of the wireless case. In other words, the processes of Steps S201 to S205 are performed similarly to those of Steps S101 to Step S105 illustrated in FIG. 6.

However, in the case of the wired power transmission, the user 101 connects the power transmitting unit 333 of the power generation device 120 that is a power transmission source and the power receiving unit 431 of the power storage device 130 that is a power transmission destination to each other through a wire. Accordingly, in Step S205, the control unit 210 that has selected the power transmission source and the power transmission destination notifies the user 101 of information relating to the power transmission source and the power transmission destination through the output unit 212.

Then, in Step S206, the control unit 210 checks a connection status of the power generation device 120 designated as the power transmission source and the power storage device 130 designated as the power transmission destination through the communication unit 214 and waits until the devices are connected through a wire. When it is checked that the power generation device 120 designated as the power transmission source and the power storage device 130 designated as the power transmission destination are connected to each other through a wire in a power-transmittable and receivable state, the control unit 210 causes the process to proceed to Step S207.

The processes of Steps S207 and S208 are performed similarly to those of Steps S106 and S107 illustrated in FIG. 6.

By performing the processes described above, the controller 110 can control the wired direct power supply, whereby the power supply can be performed more appropriately.

In addition, the selection of the power storage device 130 in the process of Step S205 may be performed by the control unit 210 based on the power generation information or the power consumption information that has been collected or may be performed based on a selection instruction of the user 101.

[Indirect Power Supply]

Figure 8:
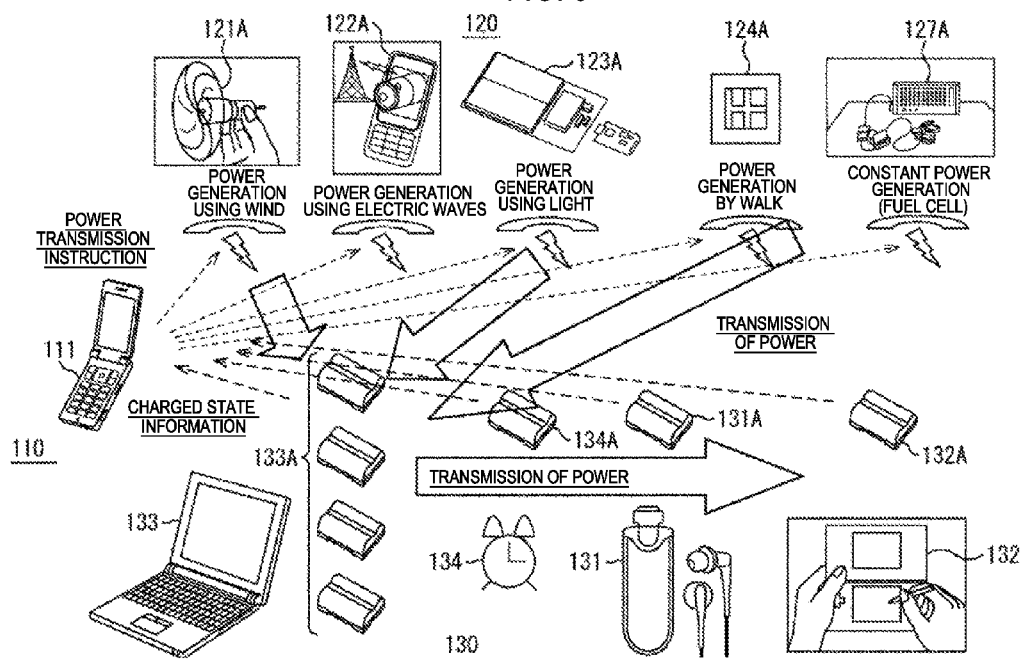
FIG. 8 is a diagram that illustrates an example of indirect power supply.

Next, indirect power supply will be described. FIG. 8 is a diagram that illustrates an example of the appearance of the indirect power supply and corresponds to FIG. 5. The controller 110 determines a power transmission destination for each power generation device 120 based on information relating to the current charge state of the power storing unit 432 of each power storage device 130, which is collected from each power storage device 130, and the like and appropriately transmits a power transmission instruction to each power generation device 120.

The cellular phone 111 acquires information relating to the power storage states of the power storing units 131A to 134A and the like and determines power transmission destinations of electric power generated by the power generating units 121A to 127A based on the information, for example, as denoted by white arrows. At this time, the cellular phone 111 performs control such that, as denoted by white arrows, first, electric power is stored at once in the power storing unit 133A of the notebook-type personal computer 133 having relatively high charging capacity, and, thereafter, as is necessary, the electric power is supplied to another power storage device 130 having relatively low power storage capacity.

Also in the case of the indirect power supply, similarly to the case of the direct power supply, there are two kinds of power transmitting methods including wireless power transmission and wired power transmission. First, an example of the flow of a wireless indirect power supply process that is performed by the controller 110 will be described with reference to a flowchart illustrated in FIG. 9.

The processes of Steps S301 to Step S303 are performed similarly to those of Steps S101 to Step S103 illustrated in FIG. 5.

In Step S304, the control unit 210 communicates with a high-capacity device that is a power storage device 130 of which the charging capacity of the power storing unit 432 is relatively high through the communication unit 214 and collects information that relates to the current power storage status of the power storing unit 432.

In Step S305, the control unit 210 notifies the user through the output unit 212 so as to bring the power transmission device (power generation device 120) and the high-capacity device (power storage device 130) to be close to each other. For example, the control unit 210 displays a message urging the user to bring the power transmission device and the high-capacity device to be close to each other within a distance (within a power transmittable distance) at which power can be transmitted and received on the monitor or outputs a voice message through the speaker.

In Step S306, the control unit 210 designates the high-capacity device as a power transmission destination based on the acquired information of the high-capacity device, and the like, and determines whether or not the high-capacity device is in a power-receivable state.

For example, in a case where the power storage amount of the power storing unit 432 of the high-capacity device designated as a power transmission destination is larger than a predetermined threshold, there is no sufficient vacant capacity, the power storing unit is not present at a power-receivable position, or the power storing unit is not in an operating state in which power can be received (in a case where the high-capacity device is not in the power-receivable state), the control unit 210 returns the process to Step S301 and repeats the subsequent processes.

On the other hand, in Step S306, in a case where it is determined that the power storage amount of the power storing unit 432 of the high-capacity device designated as a power transmission destination is smaller than the predetermined threshold, there is sufficient vacant capacity, the power storing unit is present at a power-receivable position, and the high-capacity device is in an operating state in which power can be received, the control unit 210 causes the process to proceed to Step S307.

In Step S307, the control unit 210 determines whether or not each power transmission device (power generation device 120) and the high-capacity device (power storage device 130) that transmit and receive electric power are located within a power-transmittable distance. In a case where each power transmission device and the power reception device that transmit and receive electric power are determined not to be close to each other to be within the transmittable distance, the control unit 210 returns the process to Step S301 and repeats the subsequent processes.

Further, in Step S307, in a case where both devices are determined to be close to each other to be within the power-transmittable distance based on the position information of the power transmission device and the high-capacity device, the control unit 210 causes the process to proceed to Step S308.

In Step S308, the control unit 210 transmits power generation information including a power transmission instruction for transmitting power to the power storage device 130 (high-capacity device) that is selected as a power transmission destination by the process of Step S105 to the power generation device 120 that is set as a power transmission source of the electric power through the communication unit 214. In addition, the control unit 210 transmits power consumption information that includes a power reception instruction for receiving power from the power generation device 120 that is the power transmission source of the electric power to the power storage device 130 (high-capacity device) that is set as the power transmission destination of electric power through the communication unit 214.

The power generation device 120 that is designated as the power transmission source transmits electric power in accordance with the power transmission instruction that is included in the power generation information. In addition, the power storage device 130 (high-capacity device) designated as the power transmission destination receives the electric power in accordance with the power reception instruction that is included in the power consumption information.

Figure 9:
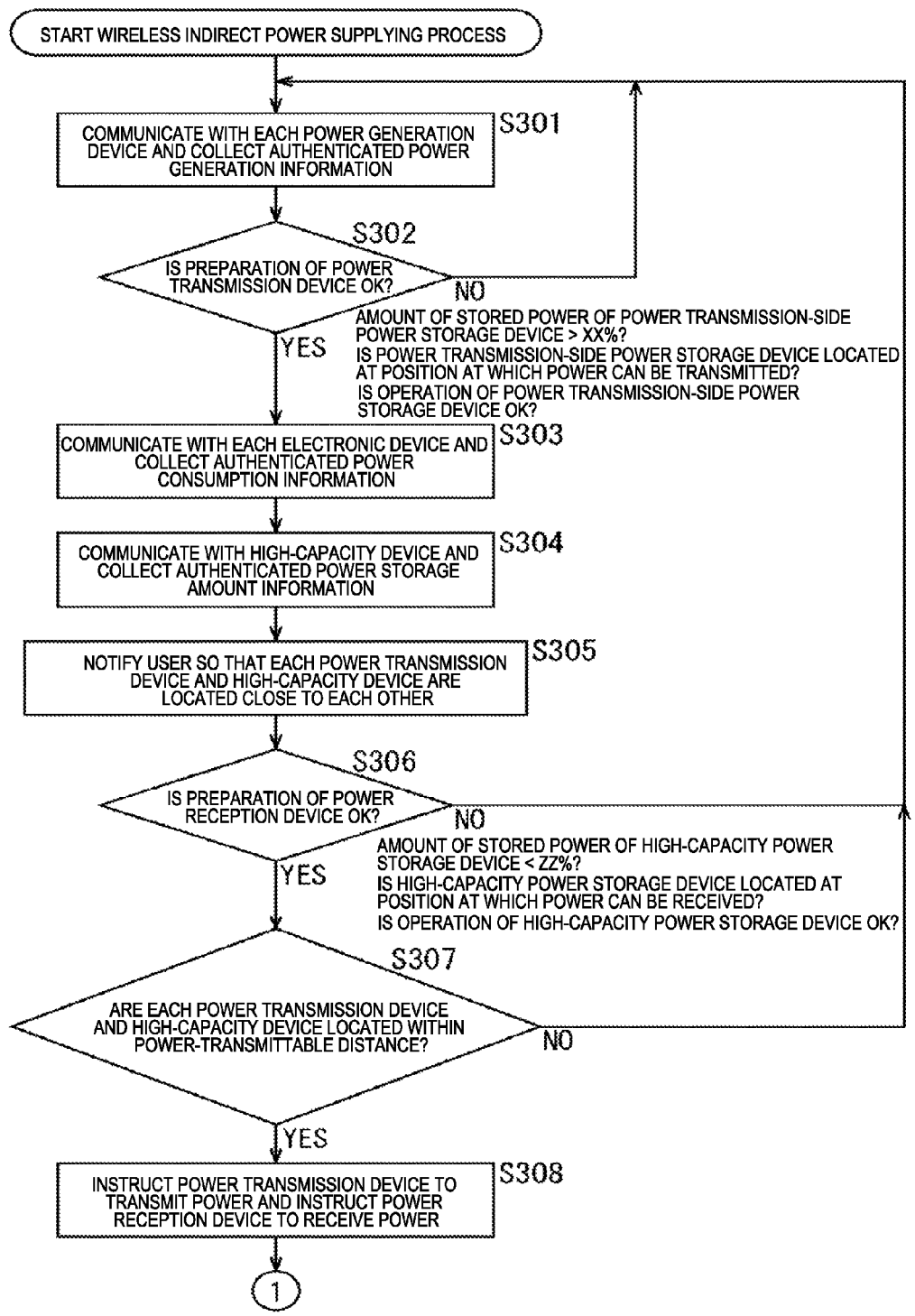
FIG. 9 is a flowchart that illustrates an example of a flow of a wireless indirect power supplying process.

When the process of Step S308 ends, the control unit 210 returns the process to Step S103 illustrated in FIG. 5 and performs the subsequent processes with the high-capacity device set as the power transmission source. In other words, each process illustrated in FIG. 9 is performed, and, when the supply of power from the power generation device 120 to the high-capacity device is completed, next, the power transmission and reception between the power storage devices 130 is started.

The communication in such a case is performed using a method that is basically the same as that of the communication between the power generation device 120 and the power storage device 130 described above.

By performing control as such, the control unit 210 can store the electric power in a power storage device 130 having relatively high charging capacity even in a case where the power generation device 120 does not have the power storing unit 332 or the capacity of the power storing unit 332 is low, whereby the electric power generated by the power generation device 120 can be controlled so as to be more effectively used.

In addition, the power transmission destination for transmitting power from each power generation device 120 can be limited (for example, unified) to a power storage device 130 having high charging capacity, and the authentication of the power storage device 130 can be easily performed (for example, the authentication is unified), whereby the system can be simplified.

Next, wired power supply will be described. An example of the flow of a wired indirect power supply process that is performed by the controller 110 will be described with reference to a flowchart illustrated in FIG. 10.

Figure 10:
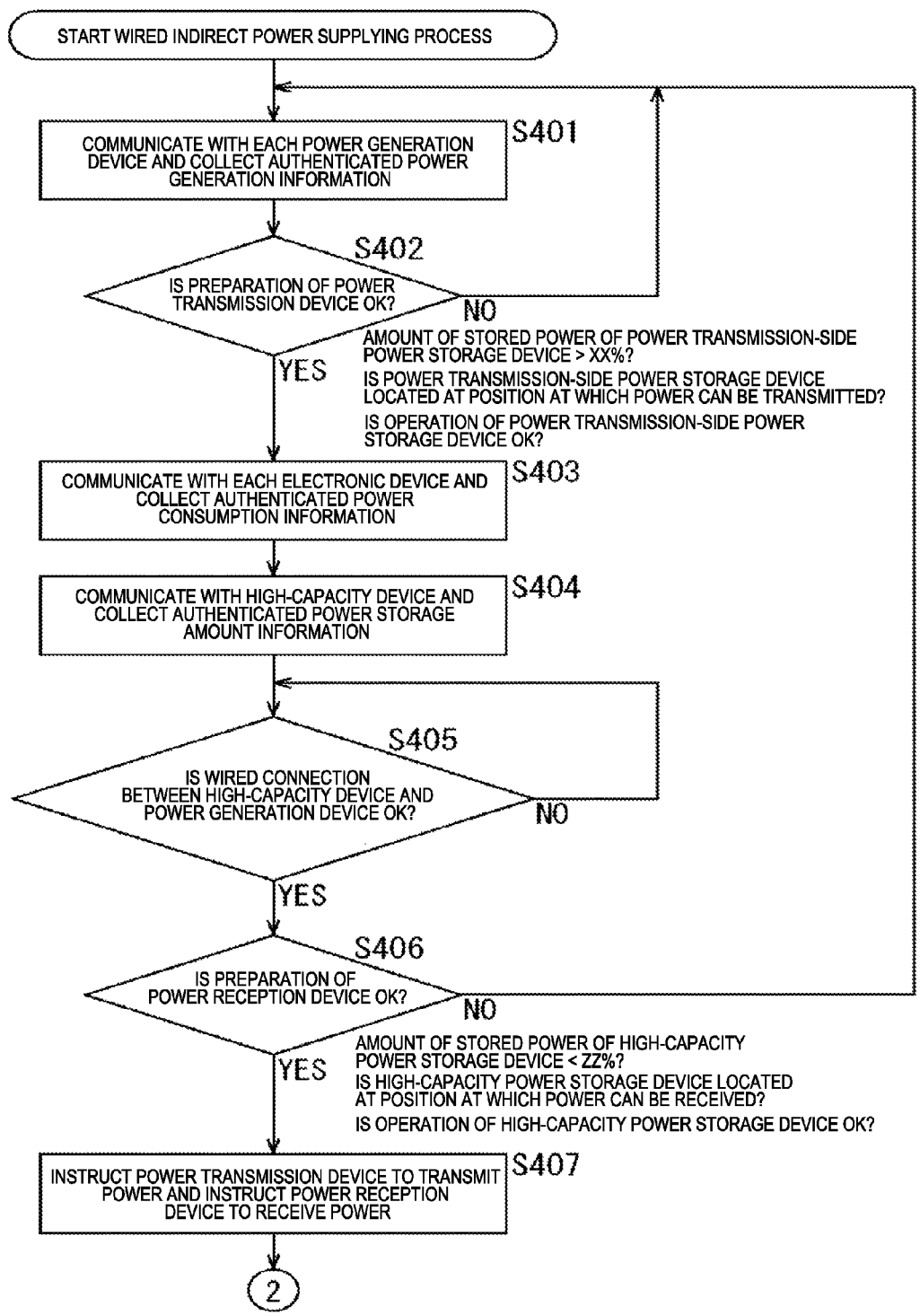
FIG. 10 is a flowchart that illustrates an example of a flow of a wired indirect power supplying process.

As illustrated in FIG. 10, also in the wired case, basically, each process is performed similarly to that of the wireless case. In other words, the processes of Steps S401 to S404 are performed similarly to those of Steps S301 to Step S304 illustrated in FIG. 9.

However, in the case of the wired power transmission, the user 101 connects the power transmitting unit 333 of the power generation device 120 that is a power transmission source and the power receiving unit 431 of the high-capacity device that is a power transmission destination to each other through a wire. Accordingly, in Step S404, the control unit 210 notifies the user 101 of information relating to the power transmission source and the power transmission destination through the output unit 212.

Then, in Step S405, the control unit 210 checks a connection status of the power generation device 120 designated as the power transmission source and the high-capacity device designated as the power transmission destination through the communication unit 214 and waits until the devices are connected through a wire. When it is checked that the power generation device 120 designated as the power transmission source and the high-capacity device designated as the power transmission destination are connected to each other through a wire in a power-transmittable and receivable state, the control unit 210 causes the process to proceed to Step S406.

The processes of Steps S406 and S407 are performed similarly to those of Steps S305 and S306 illustrated in FIG. 9.

By performing the processes described above, the controller 110 can control the wired indirect power supply, whereby the power supply can be performed more appropriately.

[Power Transmission and Reception Between Power Storage Devices]

Figure 11:
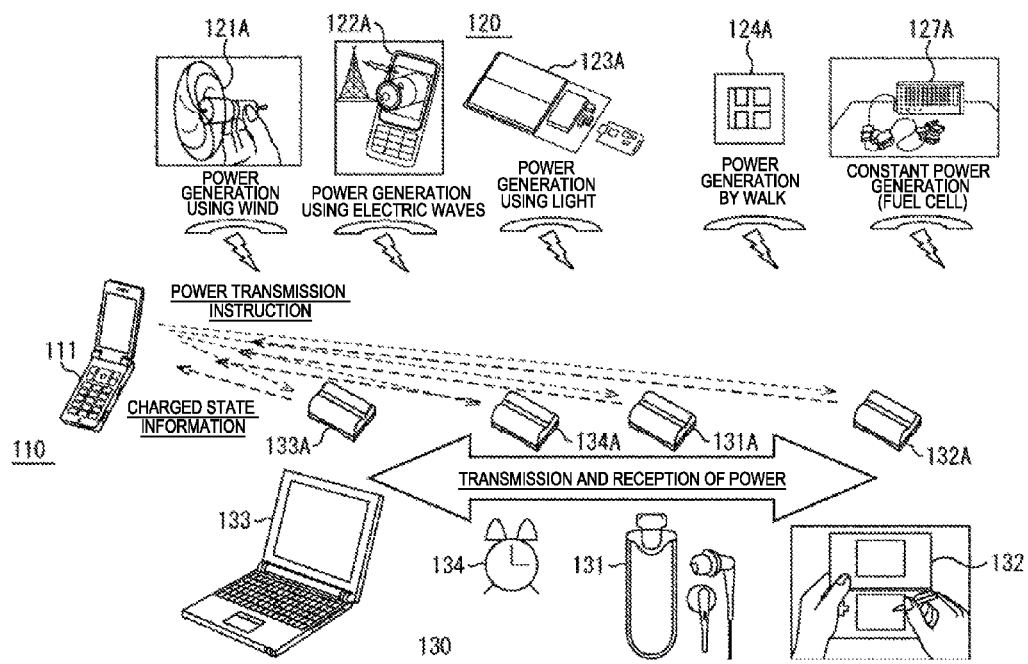
FIG. 11 is a diagram that illustrates an example of supply of electric power between power storage devices.

As above, while the supply of power between the power generation device 120 and the power storage device 130 has been described, the controller 110, for example, as illustrated in FIG. 11, may also control the supply of power between the power storage devices 130.

In such a case, each process is performed similarly to that of the supply of power from the high-capacity device to the other power storage device 130 in the above-described indirect power supply.

For example, in the wireless case, the control unit 210 of the controller 110 monitors the remaining capacity of the power storing unit 432 of each power storage device 130 through the communication unit 214 based on communications and notifies the user 101 of the remaining capacity through the output unit 212.

In a case where the remaining capacity or the remaining operating time of a power storage device 130 is below a predetermined threshold, the control unit 210 performs control such that power is supplied from a power storage device 130 having highest remaining capacity or a longest remaining operating time to the power storage device 130.

At this time, the power transmission amount is determined in accordance with the remaining capacity and the remaining operating time based on the setting of the user 101.

In addition, in the wired case, the control unit 210 monitors the remaining capacity of each power storage device 130 through the communication unit 214 based on communications and notifies the user 101 of the remaining capacity through the output unit 212.

In a case where the remaining capacity or the remaining operating time of a power storage device is below a predetermined threshold, the control unit 210 notifies the user of the status through the output unit 212 and requests the user 101 to connect a power storage device 130 having highest remaining capacity or a longest remaining operating time and the power storage device 130.

When the user 101 makes the connection, the control unit 210 instructs the transmission of power corresponding to a power transmission amount that is determined in accordance with the remaining capacity and the remaining operating time based on the setting of the user 101.

As described above, since the present invention relates to an energy system that is configured by (one or more) micro power generation devices that can be carried by a user or be attached to the body, power transmission devices that are accompanied with power generation devices, a power storage device that can be carried by a user or be attached to the body, a power reception device that is accompanied with the power storage device, a controller that controls the above-described devices, and (one or more) mobile electronic devices that consume power, the controller can transmit electric power that is generated by the power generation device to the power storage device that includes the power reception device by using the power transmission device.

Although the above-described power storage device may be independently used, it is preferable that the power storage device is built in each mobile electronic device, and accordingly, the transmitted power can be used by each mobile electronic device.

Since the above-described power generation device, for example, is one or more devices as below, power that is generated by a relatively small power generation device can be used.

1) Solar cell module
2) Various energy harvesters
3) Thermoelectric, vibration, piezoelectric, electric wave power generation, and the like
4) Fuel cell
5) Windmill power generation device In addition, since each power generation device may independently include a generated power storage device having low capacity, the power generated by each power generation device can be temporarily stored in each power storage device. Accordingly, the power can be collectively transmitted at a situation that is convenient to the user.

By controlling the power transmission device using the controller, the transmission of power (charging) from each power generation device to the power reception device that is accompanied with each power storage device is controlled, whereby the controller can select one of a plurality of power generation devices and one of a plurality of power storage devices and perform the transmission of power therebetween.

Although the transmission of power using the power transmission device is preferably performed in a wireless manner, the transmission of power may be performed each time through a wired connection, and accordingly, it is possible to cope with various power transmitting methods.

Since each power generation device includes a communication unit (for example, ZigBee) that communicates with the controller and communicates with the controller for information described below, the controller can acquire the power generation state of each power generation device and the power storage state of the generated power storage device, and accordingly, the user can be notified of the states, and power transmission control can be automatically performed.
1) The power generation state of each power generation device
2) The power storage state of the generated power storage device that is accompanied with each power generation device
3) A power transmission instruction transmitted from the controller Since each power storage device includes a communication unit that communicates with the controller and communicates with the controller for information described below, the controller can acquire the state of each power storage device, and accordingly, the user can be notified of the states, and a power reception device can be automatically selected.
1) The state (a voltage, a current, a temperature, a degraded state, and the like) of each power storage device
2) A power reception instruction transmitted from the controller
3) A power transmission instruction transmitted from the controller Each power storage device further includes a power transmission device and can transmit power in accordance with an instruction transmitted from the controller to the other power storage devices, and accordingly, power can be interchanged between the power storage devices, and, by transmitting power from a power storage device having high remaining capacity to a power storage device having low remaining capacity, the power usage of each device can be optimized.

Since the controller has an interface for a user, and settings represented below can be made by the user, the controller performs power transmission and power reception between each power generation device and the power storage device and between the power storage device and the power storage device in accordance with the setting as below, and the charging state of each power storage device is adjusted and optimized, whereby the charging state of the power storage device of each device can be realized in accordance with user's desire. In addition, since power interchange can be manually performed, power can be interchanged in a flexible manner in accordance with user's desire at that time. Furthermore, since the acquisition of a user's predicted action and the learning of the action can be performed, a device to be used can be estimated, and the power generation amount can be predicted to some degree, whereby the charging states of the devices can be optimized altogether.
1) A desirable charging state of the power storage device included in each device
2) Use priority level of devices
3) Charging priority level of devices
4) Manual power interchange between devices
5) User's predicted action
6) Learning user' action In a case where power transmission is performed through a wired connection, since the controller recommends a power transmission source and a power transmission connection destination based on the setting through the interface to the user, even in a case where the power transmission control is not automated as in the case of a wireless connection, the generated power can be used in an optimized manner by user's simple operation.

In addition, the controller 110 can perform mutual authentication with a controller of another power system. By performing mutual authentication, it is possible to receive electric power from a power system controlled by another controller or transmit electric power to the other power system.

In a case where electric power is interchanged with another power system, first, mutual authentication is performed between controllers, a controller of a power transmission-side system receives information of the power reception device from the controller of a power reception-side system and instructs the power transmission device arranged inside the power transmission-side system to transmit power to the power reception device. The controller of the power reception-side system receives information of the power transmission device from the controller of the power transmission-side system and instructs the power reception device arranged inside the power reception-side system to receive power from the power transmission device.

Accordingly, power systems that are different from each other can be connected to each other in a secured manner, and the transmission of power can be reliably performed.

A series of processes described above may be performed by either hardware or software.

In a case where the series of processes described above is performed by software, a program that configures the software is installed from a network or a recording medium.

This recording medium, for example, as illustrated in FIGS. 2 to 4, is configured not only by a removable medium 221, a removable medium 321, and a removable medium 421 each formed by a magnetic disk (including a flexible disk), an optical disk (including a compact disc-read only memory (CD-ROM) and a digital versatile disc (DVD)), an magneto-optical disk (including Mini Disc (MD)), or a semiconductor memory, on which a program is recorded, and which is distributed so as to deliver the program to the user, separately from the device main body, but also by a ROM in which a program is recorded, hard disks included in the storage unit 213, the storage unit 313, and the storage unit 413 that are delivered to the user in a state being built in the device main body, and the like.

Here, the program that is executed by the computer may be a program that performs the processes in a time series in accordance with the order described in this specification, programs that are performed in parallel with each other, or programs that perform processes at necessary timing such as at the timing of being called or the like.

In this specification, steps describing a program recorded on a recording medium include not only processes that are performed in a time series in accordance with the described order but also processes that are not necessarily performed in a time series but are performed in a parallel manner or an individual manner.

In addition, a configuration described above as one device (or a processing unit) may be configured as a plurality of devices (or processing units). Contrary to this, a configuration that has been described as a plurality of devices (or processing units) above may be configured as one device (or one processing unit). In addition, a configuration other than the configuration described above may be added to the configuration of each device (or each processing unit). Furthermore, a part of the configuration of a device (or a processing unit) may be included in the configuration of another device (or another processing unit) as long as the configuration or the operation of the whole system is substantially the same. In other words, embodiments of the present invention are not limited to the above-described embodiments, but various changes can be made therein in the range not departing from the concept of the present invention.

REFERENCE SIGNS LIST

100 Independent personal power system
110 Controller
120 Power generation device
130 Power storage device
210 Control unit
214 Communication unit
310 Control unit
331 Power generating unit
332 Power storing unit
333 Power transmitting unit
410 Control unit
431 Power receiving unit
432 Power storing unit
433 Power consuming unit
434 Power transmitting unit

The invention claimed is:

1. A control device that controls transmission and reception of electric power between a power generation device that generates electric power and a power storage device that stores electric power, comprising:
    a first acquiring unit that acquires first information that is information relating to a power generation status of the power generation device;
    a second acquiring unit that acquires second information that is information relating to a power storage state of the power storage device, wherein the second information includes information relating to a remaining operating time of a power consuming unit included in the power storage device that is based on a power storage amount of a power storing unit included in the power storage device;
    a determining unit that determines the power storage device set as a power transmission destination of the electric power generated by the power generation device in accordance with the power generation status represented in the first information that has been acquired by the first acquiring unit and the power storage state represented in the second information that has been acquired by the second acquiring unit, wherein the determining unit determines the power storage device set as the power transmission destination based on the information relating to the remaining operating time of the power consuming unit;
    a first supplying unit that supplies the power generation device as a power transmission source with a power transmission instruction for instructing to start transmitting the electric power to the power storage device determined by the determining unit as the power transmission destination; and
    a second supplying unit that supplies the power storage device determined by the determining unit as the power transmission destination with a power reception instruction for instructing to start receiving the electric power from the power generation device as the power transmission source.

2. The control device according to claim 1,
    wherein the first information includes a current power generation output and a past power generation output history of the power generation device, and
    wherein the determining unit predicts a power generation output for the future based on the current power generation output and the past power generation output history of the power generation device and determines the power storage device set as the power transmission destination in accordance with the prediction result.

3. The control device according to claim 1, further comprising:
    a determining unit that determines whether or not the power generation device can perform power transmission based on a power storage state of a power storing unit,
    wherein the power generation device includes the power storing unit and performs power transmission after storing the generated electric power in the power storing unit,
    wherein the first information includes information relating to the power storage state of the power storing unit, and
    wherein the first supplying unit supplies the power transmission instruction only in a case where the power generation device is determined by the determining unit to be capable of performing power transmission.

4. The control device according to claim 1,
    wherein the power generation device includes a power storing unit and performs power transmission after storing the generated electric power in the power storing unit,
    wherein the first information includes information relating to a power storage state of the power storing unit and information representing a result of the determination whether or not the power generation device can perform power transmission, the determination having been performed based on the power storage state of the power storing unit, and
    wherein the first supplying unit supplies the power transmission instruction only in a case where the power generation device is determined to be able to perform power transmission based on the information representing the result of the determination whether the power generation device can perform power transmission, the information being included in the first information acquired by the acquiring unit.

5. The control device according to claim 1, further comprising:
    a third acquiring unit that acquires information representing a result of a determination whether or not the power generation device can perform power transmission, the determination having been performed based on the power storage state of a power storing unit, the information being supplied from the power generation device in response to the power transmission instruction supplied by the first supplying unit,
    wherein the power generation device includes the power storing unit and performs power transmission after storing the generated electric power in the power storing unit.

6. The control device according to claim 1, further comprising:
    a managing unit that makes a prediction about reliability, a life, and the like of the power storing unit based on information relating to a usage history of the power storing unit and manages a maintenance schedule of a power storing unit, wherein the power generation device includes the power storing unit and performs power transmission after storing the generated electric power in the power storing unit, and wherein the first information includes information relating to the usage history of the power storing unit.

7. The control device according to claim 1, further comprising:

an authentication unit that authenticates the power generation device using authentication individual information of the power generation device, wherein the first information includes the authentication individual information of the power generation device.

8. The control device according to claim 1, wherein the first information includes information relating to a prediction of a next time at which the power generation device can perform power transmission, and wherein the first supplying unit supplies the power transmission instruction at a time when the power generation device can perform power transmission next time based on the information relating to the prediction of the next time at which the power generation device can perform power transmission.

9. The control device according to claim 1, wherein the first information includes position information of the power generation device, and wherein the first supplying unit supplies the power transmission instruction only in a case where the power generation device is present at a power-transmittable position based on the position information of the power generation device.

10. The control device according to claim 1, wherein the first information includes information that represents an operating state of a power transmitting unit included in the power generation device, and wherein the first supplying unit supplies the power transmission instruction only in a case where the power transmitting unit is in a power-transmittable operating state based on the information that represents the operating state of the power transmitting unit.

11. The control device according to claim 1, wherein the second information includes information relating to a current power storage state of a power storing unit included in the power storage device, and wherein the determining unit determines the power storage device set as the power transmission destination based on the information relating to the current power storage state of the power storing unit.

12. The control device according to claim 1, further comprising:

an authentication unit that authenticates the power storage device using authentication individual information of the power storage device, wherein the second information includes the authentication individual information of the power storage device.

13. The control device according to claim 1, wherein the second information includes position information of the power storage device, and wherein the second supplying unit supplies the power reception instruction only in a case where the power storage device is present at a power-receivable position based on the position information of the power storage device.

14. The control device according to claim 1, wherein the second information includes information relating to an operating state of a power receiving unit included in the power storage device, and wherein the second supplying unit supplies the power reception instruction only in a case where the power receiving unit is in a power-receivable operating state based on the information representing the operating state of the power receiving unit.

15. The control device according to claim 1, wherein the determining unit determines, as the power transmission destination, the power storage device that includes a power consuming unit that consumes the electric power generated by the power generation device.

16. The control device according to claim 1, wherein the determining unit determines the power storage device that includes a power storing unit having relatively high capacity as the power transmission destination.

17. The control device according to claim 1, wherein transmission and reception of electric power between the power storage devices is also controlled, wherein the determining unit sets the power storage device as the power transmission source and determines the power storage device set as the power transmission destination of the electric power stored in the power storage device as the power transmission source, and wherein the first supplying unit supplies the power transmission instruction to the power storage device as the power transmission source.

18. The control device according to claim 1, wherein the second acquiring unit acquires, from another control device that controls a power generation device and a power storage device other than the power generation device and the power storage device that are controlled by the second acquiring unit, the second information of the power storage device controlled by the another control device, wherein the determining unit determines the power storage device set as the power transmission destination of the electric power that is generated by the power generation device in accordance with the power generation status represented in the first information that has been acquired by the first acquiring unit and the power storage state represented in the second information, which has been acquired by the second acquiring unit, of the power storage device that is controlled by the another control device, and wherein the second supplying unit supplies the power reception instruction to the power storage device determined as the power transmission destination by the determining unit through the another control device.

19. The control device according to claim 1, wherein the first acquiring unit acquires, from another control device that controls a power generation device and a power storage device other than the power generation device and the power storage device that are controlled by the first acquiring unit, the first information of the power generation device controlled by the another control device, wherein the determining unit determines the power storage device set as the power transmission destination of the electric power that is generated by the power generation device in accordance with the power generation status represented in the first information, which has been acquired by the first acquiring unit, of the power generation device controlled by the another control device and the power storage state represented in the second information that has been acquired by the second acquiring unit, and wherein the first supplying unit supplies the power transmission instruction to the power generation device as the power transmission source through the another control device.

20. The control device according to claim 1, further comprising:
a mutual authentication unit that performs mutual authentication with another control device that controls a power generation device and a power storage device other than the power generation device and the power storage device that are controlled by the control device.

21. A method of controlling a control device that controls transmission and reception of electric power between a power generation device that generates electric power and a power storage device that stores electric power, the method comprising:
acquiring first information that is information relating to a power generation status of the power generation device by using a first acquiring unit of the control device;
acquiring second information that is information relating to a power storage state of the power storage device by using a second acquiring unit of the control device, wherein the second information includes information relating to a remaining operating time of a power consuming unit included in the power storage device that is based on a power storage amount of a power storing unit included in the power storage device;
determining the power storage device set as a power transmission destination of the electric power generated by the power generation device in accordance with the power generation status represented in the acquired first information and the power storage state represented in the acquired second information by using a determining unit of the control device, wherein the determining comprises determining the power storage device set as the power transmission destination based on the information relating to the remaining operating time of the power consuming unit;
supplying the power generation device as a power transmission source with a power transmission instruction for instructing to start transmitting the electric power to the power storage device that has been determined as the power transmission destination by using a first supplying unit of the control device; and
supplying the power storage device determined as the power transmission destination with a power reception instruction for instructing to start receiving the electric power from the power generation device as the power transmission source by using a second supplying unit of the control device.

22. A power control system comprising:
a power generation device that performs power generation;
a power storage device that stores electric power; and
a control device that controls transmission and reception of the electric power between the power generation device and the power storage device,
wherein the control device includes:
a first acquiring unit that acquires first information that is information relating to a power generation status of the power generation device;
a second acquiring unit that acquires second information that is information relating to a power storage state of the power storage device, wherein the second information includes information relating to a remaining operating time of a power consuming unit included in the power storage device that is based on a power storage amount of a power storing unit included in the power storage device;
a determining unit that determines the power storage device set as a power transmission destination of the electric power generated by the power generation device in accordance with the power generation status represented in the first information that has been acquired by the first acquiring unit and the power storage state represented in the second information that has been acquired by the second acquiring unit, wherein the determining unit determines the power storage device set as the power transmission destination based on the information relating to the remaining operating time of the power consuming unit;
a first supplying unit that supplies the power generation device as a power transmission source with a power transmission instruction for instructing to start transmitting the electric power to the power storage device determined by the determining unit as the power transmission destination; and
a second supplying unit that supplies the power storage device determined by the determining unit as the power transmission destination with a power reception instruction for instructing to start receiving the electric power from the power generation device as the power transmission source,
wherein the power generation device includes:
a power generating unit that performs power generation;
a third supplying unit that supplies the control device with information relating to a power generation status according to the power generating unit;
a third acquiring unit that acquires the power transmission instruction from the control device that has supplied the information relating to the power generation status of the power generating unit using the third supplying unit; and
a power transmitting unit that transmits the electric power, generated by the power generation unit and acquired, to the power storage device that is designated as the power transmission destination in accordance with the power transmission instruction that has been acquired by the third acquiring unit, and
wherein the power storage device includes:
a fourth supplying unit that supplies the control device with information relating to a power storage state;
a fourth acquiring unit that acquires the power reception instruction from the control device that has supplied the information relating to the power storage state using the fourth supplying unit;
a power receiving unit that receives the electric power that is supplied from the power generation device that is designated as a power transmission source in accordance with the power reception instruction acquired by the fourth acquiring unit; and
a power storing unit that stores the electric power received by the power receiving unit.

* * * * *